United States Patent
Diamond et al.

(10) Patent No.: US 9,965,528 B2
(45) Date of Patent: *May 8, 2018

(54) SYSTEM AND METHODS FOR GENERATING QUALITY, VERIFIED, SYNTHESIZED, AND CODED INFORMATION

(71) Applicant: REMOTE SENSING METRICS, LLC, Chicago, IL (US)

(72) Inventors: Alex H. Diamond, Buena Vista, CO (US); Thomas Peter Diamond, Chicago, IL (US)

(73) Assignee: Remote Sensing Metrics, LLC, Chicago, IL (US)

( * ) Notice: Subject to any disclaimer, the term of this patent is extended or adjusted under 35 U.S.C. 154(b) by 712 days.

This patent is subject to a terminal disclaimer.

(21) Appl. No.: 14/301,098

(22) Filed: Jun. 10, 2014

(65) Prior Publication Data

US 2014/0365470 A1 Dec. 11, 2014

Related U.S. Application Data

(60) Provisional application No. 61/833,431, filed on Jun. 10, 2013.

(51) Int. Cl.
G06F 17/30 (2006.01)
G06Q 30/02 (2012.01)
G06Q 10/06 (2012.01)

(52) U.S. Cl.
CPC ..... *G06F 17/30554* (2013.01); *G06Q 10/063* (2013.01); *G06Q 30/02* (2013.01)

(58) Field of Classification Search
CPC ............. G06K 9/0063; G06K 9/00637; G06K 9/00657; G06K 9/6232; G06K 9/6298; G06Q 10/04; G06T 7/00; G08B 13/19663; G08B 13/19608; G08B 13/19606
USPC ........ 707/708, 722; 382/103, 170, 181, 291, 382/294
See application file for complete search history.

(56) References Cited

U.S. PATENT DOCUMENTS

| | | |
|---|---|---|
| 6,178,253 B1 | 1/2001 | Hendrickson et al. |
| 6,421,610 B1 | 7/2002 | Carroll et al. |
| 6,501,857 B1 | 12/2002 | Gotsman et al. |

(Continued)

FOREIGN PATENT DOCUMENTS

| | | |
|---|---|---|
| DE | 1982820 A1 | 12/1999 |
| EP | 2529610 A1 | 12/2012 |

(Continued)

OTHER PUBLICATIONS

Javiers et al: NPL titled: New Big Brother: Market-Moving Satellite Images, Aug. 16, 2010.*

(Continued)

*Primary Examiner* — Hanh Thai
(74) *Attorney, Agent, or Firm* — Valauskas Corder LLC

(57) ABSTRACT

The present invention relates generally to gathering, verifying, and providing information in an easy-to-understand format. Representations are obtained and evaluated to extract selected content or content information from which certain synthesized information can be gathered, collected, estimated, calculated, or determined. In addition, supplemental synthesized information may be gathered, collected, estimated, calculated, or determined.

18 Claims, 39 Drawing Sheets

(56) References Cited

U.S. PATENT DOCUMENTS

| | | | |
|---|---|---|---|
| 6,883,000 B1* | 4/2005 | Gropper | G06Q 10/1093 |
| 7,068,816 B1 | 6/2006 | Knoblauch et al. | |
| 7,536,025 B2 | 5/2009 | Folchetti et al. | |
| 7,660,430 B2 | 2/2010 | Navulur et al. | |
| 7,730,009 B1* | 6/2010 | Higgins | G06N 5/02 |
| | | | 706/50 |
| 7,802,283 B2* | 9/2010 | Banker | G06F 17/3089 |
| | | | 725/44 |
| 7,940,959 B2 | 5/2011 | Rubenstein | |
| 8,326,536 B1 | 12/2012 | Hoff | |
| 8,341,110 B2 | 12/2012 | Dalton | |
| 8,411,903 B2 | 4/2013 | Paris et al. | |
| 9,449,080 B1* | 9/2016 | Zhang | G06F 17/30657 |
| 2003/0040971 A1 | 2/2003 | Freedenberg et al. | |
| 2003/0135488 A1* | 7/2003 | Amir | G06F 17/30038 |
| 2004/0059705 A1* | 3/2004 | Wittke | G06N 5/00 |
| 2004/0260513 A1 | 12/2004 | Fitzpatrick et al. | |
| 2005/0162515 A1 | 7/2005 | Venetianer et al. | |
| 2005/0222829 A1 | 10/2005 | Dumas | |
| 2005/0288957 A1 | 12/2005 | Eraker et al. | |
| 2007/0005618 A1* | 1/2007 | Ivanov | G06Q 30/00 |
| 2007/0180131 A1 | 8/2007 | Goldstein | |
| 2008/0059189 A1* | 3/2008 | Stephens | G10L 13/08 |
| | | | 704/258 |
| 2008/0133488 A1* | 6/2008 | Bandaru | G06F 17/30864 |
| 2009/0005968 A1 | 1/2009 | Vengroff et al. | |
| 2009/0177381 A1* | 7/2009 | Taniguchi | G01C 21/3679 |
| | | | 701/454 |
| 2009/0187575 A1* | 7/2009 | DaCosta | G06Q 30/06 |
| 2009/0285487 A1* | 11/2009 | Knoblock | G06F 17/30061 |
| | | | 382/190 |
| 2010/0005087 A1* | 1/2010 | Basco | G06F 17/30867 |
| | | | 707/E17.017 |
| 2011/0007094 A1* | 1/2011 | Nash | G06F 17/30244 |
| | | | 345/634 |
| 2011/0288895 A1* | 11/2011 | Perez, Jr. | G06Q 10/06 |
| | | | 705/7.12 |
| 2011/0295575 A1* | 12/2011 | Levine | G06Q 30/02 |
| | | | 703/2 |
| 2011/0302124 A1* | 12/2011 | Cai | G06F 17/30707 |
| | | | 706/52 |
| 2012/0269395 A1* | 10/2012 | Coulter | G06K 9/00369 |
| | | | 382/103 |
| 2012/0274482 A1 | 11/2012 | Chen et al. | |
| 2013/0050517 A1 | 2/2013 | Fan et al. | |

FOREIGN PATENT DOCUMENTS

| | | |
|---|---|---|
| JP | 2008152810 A | 7/2008 |
| JP | 2008257488 A | 10/2008 |
| KR | 20050096853 A | 10/2005 |
| WO | 2009129496 A2 | 10/2009 |
| WO | 2011079324 A2 | 6/2011 |
| WO | 2013032823 A1 | 3/2013 |

OTHER PUBLICATIONS

Wergeles, F. Commercial Satellite Imagery. (Apr. 1998). Retrieved from SCIP Strategic and Competitive Intelligence Professionals: http://www.scip.org/Publications/CIMArticleDetail.cfm?ItemNumber=1318.

Gannes, L. Parking Lots Help Predict Earnings. (Aug. 18, 2010). Retrieved from GIGOM: http://gigaom.com/2010/08/18/parking-lots-help-predict-earnings/.

Blanco, A. Satellite Imagery as Alternative Research for Investors. (Oct. 27, 2011). Retrieved from Integrity Research Associates: http://www.integrity-research.com/cms/2011/10/27/satellite-imagery-as-alternative-research-for-investors/.

Luccio, M. Business Uses of Satellite Imagery. (2012). Retrieved from Imaging Notes: http://www.imagingnotes.com/go/articleJ.php?mp_id=311.

Clark, E. Satellite Imagery Used for Sales Lead Generation. (Sep. 19, 2007). Retrieved from Gizmag: http://www.gizmag.com/go/8063/.

Imaging to Driven Remote Sensing Satellite Market. (May 31, 2012). Retrieved from optics.org: http://optics.org/ews/3/5/43.

Kouchoukos, N. Globall Agricultural Production Estimates from Advanced Image Analysis. (2011). Retrieved from Lanworth: http://www.commoditymkts.org/Documents/NK%20Lanworth.pdf.

Satellite Imagery: Elevating Insight Three Powerful Ways GeoEye Introduces New Information Services Business Line. (2010). Retrieved from EIJ Earth Imaging Journal: http://eijournal.com/2010/satellite-imagery-elevating-insight-three-powerful-ways-geoeye-introduces-new-information-services-business-line.

* cited by examiner

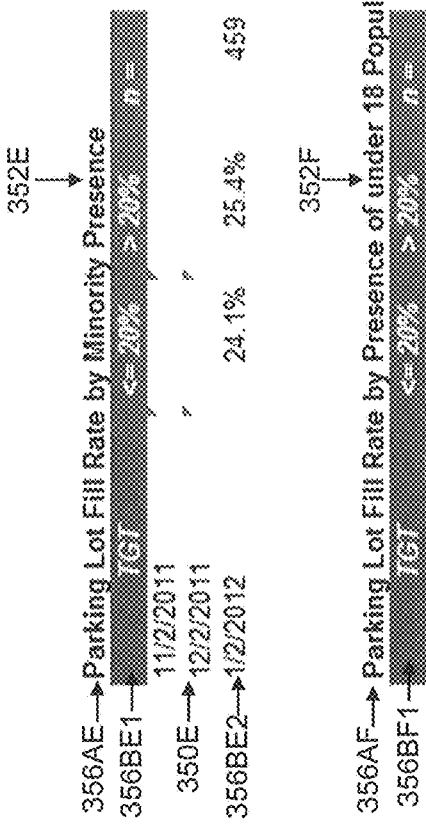
FIG. 3E
FIG. 3F
FIG. 3G
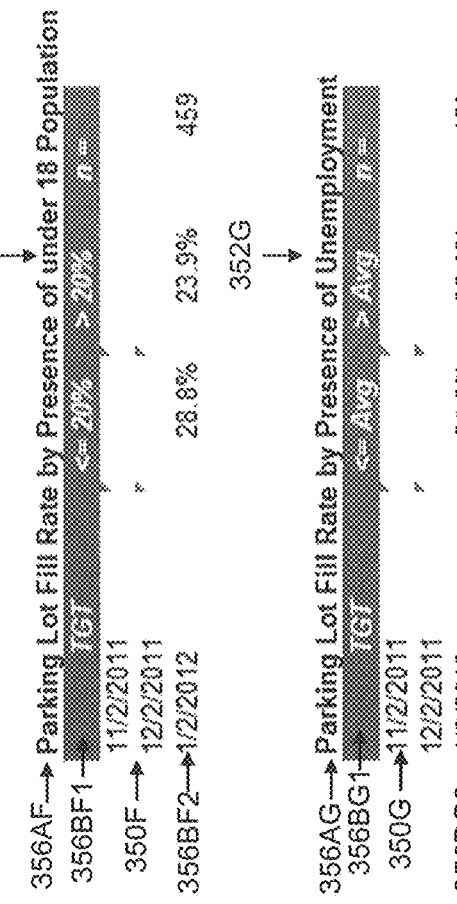
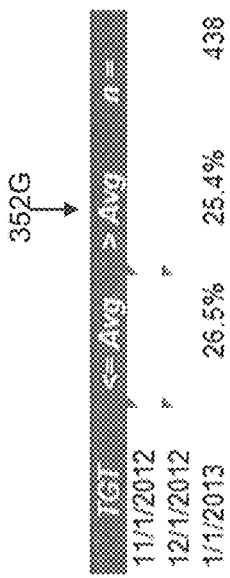

| Order | Ticker | Type | Disc Type_2 | Street Year Month Day UTC | Address | State | Zip | Zip4 | Cars | Notes | UTC Time | Date | Time |
|---|---|---|---|---|---|---|---|---|---|---|---|---|---|
| | | TGT_1 | | 12JAN0121350 | 74-5455 MAKALA BLVD KAILUA-KONA | | | 0.2254 | | | 11:35 01- | 11:35 |
| 3097 | TGT | | 4135 | 6 | | HI | 96740 | 21042 | 51 | | 1701-2013 | |

The Current and Prior Quarter view shows monthly and quarterly year-over-year traffic growth trends at a glance for each retail and restaurant name.

| BBBY | | |
|---|---|---|
| Month | YOY | Quarter |
| Jun-13 | -3.5% | -1.0% |
| Jul-13 | 2.9% | |
| Aug-13 | -1.7% | |
| Sep-13 | -2.4% | -1.2% |
| Oct-13 | -1.5% | |
| Nov-13 | 0.6% | |

| BBY | | |
|---|---|---|
| Month | YOY | Quarter |
| May-13 | -2.7% | -1.8% |
| Jun-13 | -4.7% | |
| Jul-13 | 2.7% | |
| Aug-13 | 2.1% | 1.2% |
| Sep-13 | 0.4% | |
| Oct-13 | 1.3% | |

| BIG | | |
|---|---|---|
| Month | YOY | Quarter |
| May-13 | -2.1% | -2.0% |
| Jun-13 | -0.8% | |
| Jul-13 | -3.5% | |
| Aug-13 | 0.2% | -1.7% |
| Sep-13 | -2.7% | |
| Oct-13 | -2.2% | |

| CMG | | |
|---|---|---|
| Month | YOY | Quarter |
| Apr-13 | -1.3% | -1.0% |
| May-13 | -2.1% | |
| Jun-13 | 0.3% | |
| Jul-13 | 1.0% | 1.8% |
| Aug-13 | 2.4% | |
| Sep-13 | 2.0% | |

| DG | | |
|---|---|---|
| Month | YOY | Quarter |
| May-13 | 4.2% | 4.2% |
| Jun-13 | 3.9% | |
| Jul-13 | 4.4% | |
| Aug-13 | 3.7% | 1.4% |
| Sep-13 | 1.1% | |
| Oct-13 | -0.4% | |

| HD | | |
|---|---|---|
| Month | YOY | Quarter |
| May-13 | 12.8% | 14.0% |
| Jun-13 | 18.3% | |
| Jul-13 | 11.5% | |
| Aug-13 | 4.0% | 2.3% |
| Sep-13 | 1.1% | |
| Oct-13 | 2.0% | |

RS Metrics Restaurant TrafficTracker Report

TRAFFIC ONLY REFLECTS LUNCHTIME GROWTH. THIS IS NOT A REPRESENTATION OF ALL DAY TRAFFIC GROWTH
*Changes in day-parts, promotions, and customer throughput can significantly impact the relationship between lunchtime and all day traffic growth*
All traffic growth measurements are from approximately 11:00am - 1:00pm
Comps = Traffic Growth + Shopper Conversion Growth + Avg Ticket Growth

BWLD

| Month | YOY | Quarter |
|---|---|---|
| Jan-14 | -2.0% | |
| Feb-14 | 3.5% | 1.1% |
| Mar-14 | 1.6% | |
| Apr-14 | -1.2% | |
| May-14 | TBD | |
| Jun-14 | TBD | |

CMG

| Month | YOY | Quarter |
|---|---|---|
| Jan-14 | -2.8% | |
| Feb-14 | -1.8% | -0.3% |
| Mar-14 | 3.5% | |
| Apr-14 | 5.6% | |
| May-14 | TBD | |
| Jun-14 | TBD | |

PNRA

| Month | YOY | Quarter |
|---|---|---|
| Jan-14 | -1.7% | |
| Feb-14 | -2.0% | -1.2% |
| Mar-14 | 0.4% | |
| Apr-14 | 0.7% | |
| May-14 | TBD | |
| Jun-14 | TBD | |

SBUX

| Month | YOY | Quarter |
|---|---|---|
| Jan-14 | 1.3% | |
| Feb-14 | 2.5% | 1.4% |
| Mar-14 | 0.7% | |
| Apr-14 | 3.0% | |
| May-14 | TBD | |
| Jun-14 | TBD | |

FIG. 4G

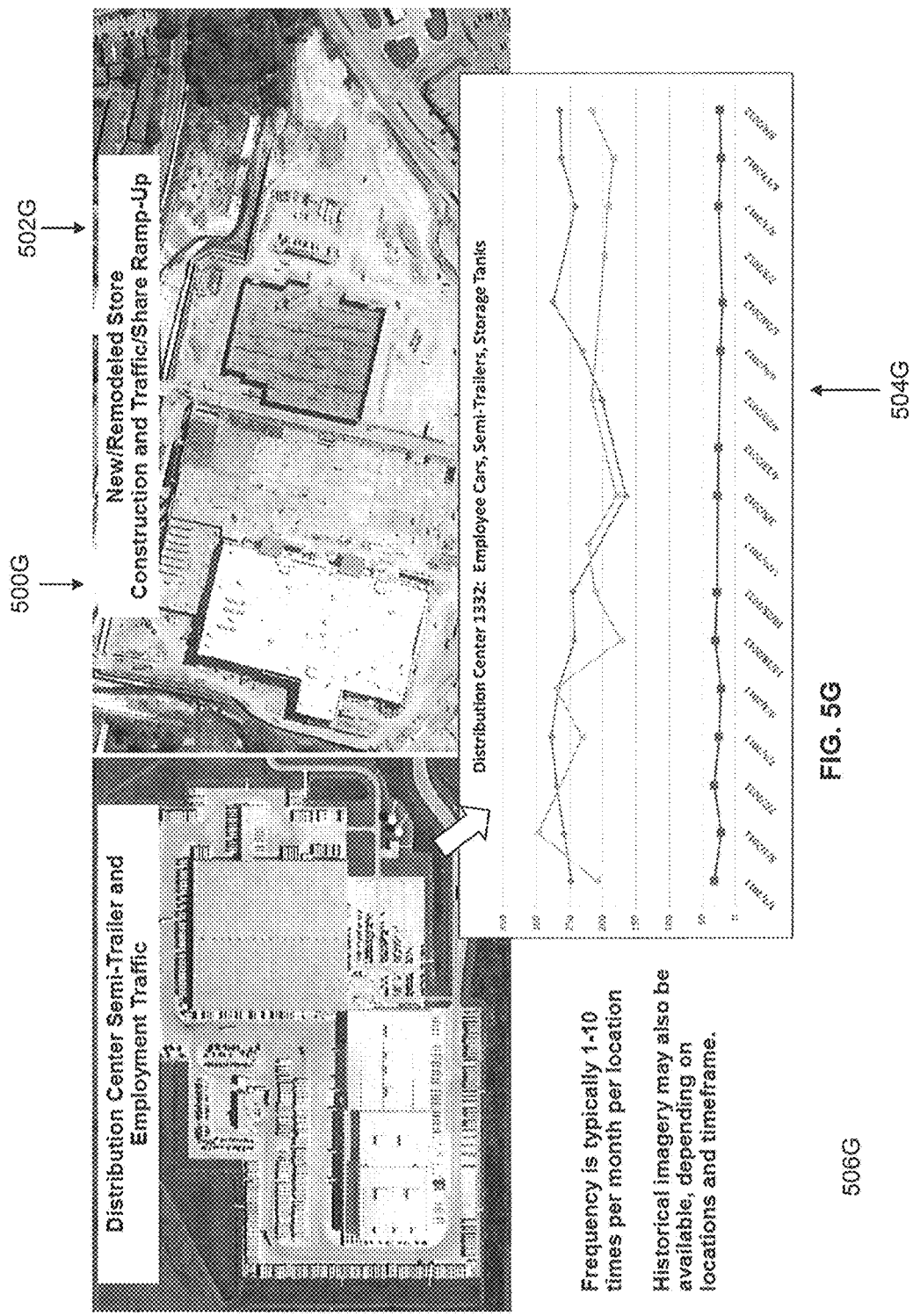

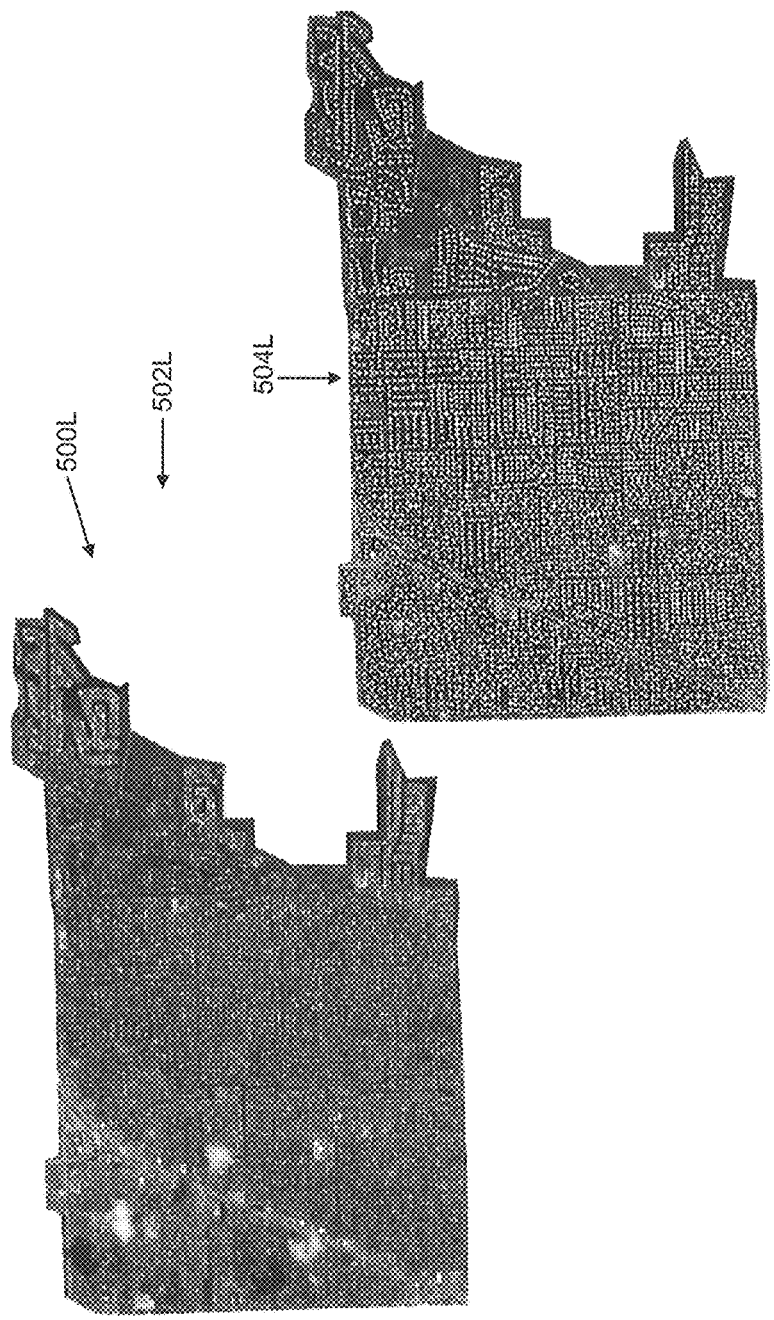

SYSTEM AND METHODS FOR GENERATING QUALITY, VERIFIED, SYNTHESIZED, AND CODED INFORMATION

CROSS-REFERENCE TO RELATED APPLICATIONS

This application claims priority to U.S. Provisional Application No. 61/833,431 filed Jun. 10, 2013, which is incorporated by reference herein in its entirety.

FIELD OF THE INVENTION

The present invention relates generally to gathering, verifying, and providing information in an easy-to-understand format.

BACKGROUND OF THE INVENTION

From time to time, a person or entity may wish to acquire information regarding a person, group, entity, item, location, event, or trend. For purposes of this application, the term "target" will be used to collectively describe a person, group, entity, item, location, event, trend or anything else about which a person wishes to acquire information.

While there are many processes available for gathering information about a target, one source is a physical copy of a publication such as a book, magazine, journal, newspaper, or similar to acquire information. However, such publications may be time-consuming to locate and may not address a specific topic about which the person is interested in obtaining information. Also, because of production time required for publishing paper copies, the information about a topic may or may not be up-to-date.

Of course, other information resources are faster and easier to locate using a computer system, for example, via the World Wide Web ("Internet" or "Web"). Wikipedia is one such resource. Wikipedia is an encyclopedia that permits volunteers to submit articles. Advantageously, Wikipedia and other Internet resources do not require a long production time. In general, a person may prepare content and upload it to the Internet within minutes. However, while a person may find a Wikipedia article or other Internet resource related to a general overview of a topic or a narrow range of information on the topic, the person may or may not be able to find an Internet resource related to a specific topic or a specific detail of a topic.

Another limitation of Wikipedia and other Internet resources is that, even though the technology exists to permit speedy updating of a resource upon availability of new information, the resources often are not updated on any schedule. For example, the author/contributor of the content may have moved on to another project or not learned about the new information available.

In addition, even if the person finds an up-to-date Internet resource related to the specific topic about which the person wishes to obtain information, the person often does not know the accuracy of the information. Accuracy of information may be assessed by determining the primary source of the information, but certain Internet resources do not identify the primary source or identify only general information about the primary source. For example, Wikipedia articles identify the contributors to an article by an Internet Protocol address configured to identify a device or by a contributor's username, which may include a pseudonym, nickname, or a full name. Even if the username identifies the full name of the contributor, the consumer may not know what authority the person has to write on the topic without doing additional background research.

Consumers who wish to obtain accurate information often take additional steps to verify the accuracy of the information obtained on the Internet, which may be a time consuming process. Consumers engage in the verification process until: they believe they have located the primary source of the content; or have located some authoritative confirmation that the topic content is accurate; or simply run out of time. The overall lack of confidence in the accuracy of much of the content found on the Internet makes it a less reliable source of information relative to traditional sources.

At times, the full scope of information that a user wishes to obtain regarding a topic is not found in any one resource. In such instances, a consumer may identify two or more resources that contain some information about the topic. Then, the consumer may compare, combine, or otherwise synthesize the information obtained from two resources. However, to obtain an accurate synthesized result, the consumer must complete the verification process for each of the at least two sets of information.

Even if the consumer obtains two sets of verified information, there may be an additional question about whether the two sets of information are compatible for comparison or synthesis. For example, if a consumer wishes to compare the holiday season sales of a first retail store to the holiday season sales of a second retail store, the consumer may obtain two sets of information such as, (1) the number of vehicles in the parking lot of the first retail store during one day in the holiday season and (2) the number of vehicles in the parking lot of the second retail store during a day in the holiday season. However, if the vehicle count at each store did not occur on the same day, the value of the comparison may be limited. For example, if there was a snow storm (during which fewer people shopped at any store) on the day the count was done at the first store, but no snow storm on the day the count was done at the second store, any difference between the counts may be the result of the snow storm and not the relative success of each store. Accordingly, steps must be taken to account for differences in how and when the information was obtained.

For purposes of this application, the term "vehicles" includes at least cars, automobiles, minivans, full sized vans, trucks, motorcycles, trains, planes, and any other machine that permits transporting at least one person from a first location to a second location.

In other circumstances, certain specific and verified information about the target is not available, even by combining multiple sources of information. Instead, the information that a person wishes to obtain may need to be derived from observing the target directly or calculated using observable information obtained from observing the target. The observable information may be combined with or compared to contextual information to generate certain desired information.

At times, observable information about the target may be obtained in many different ways. For example, because certain targets may have multiple components or may be mobile, obtaining observable information may require capturing information in multiple locations or at multiple points in time. One way to obtain such information is to record the target for location-remote or time-shifted viewing using a recording device.

For purposes of this application, a "recording device" is any machine configured to generate a representation—including a visual representation or audio representation—of a target. A visual representation may be a representation of the target as of a date including in some expression such as graph, table, or chart. A recording device may be configured as a camera or a rendering instrument. Examples of a camera include a still camera, digital camera, video camera, webcam, camera integrated with a mobile phone, traffic camera, security camera, satellite camera, aerial mapping camera, aerial laser measurement (LiDAR), aerial or satellite radar measurement (SAR), aerial thermal mapping (heat), vehicle-mounted cameras (Google Streetview, or other views generated from car, truck, van, train, helicopter, airplane, space shuttle, or boat, to name a few), and can include audio recording devices or used with pneumatic tubes to measure car movements.

A rendering instrument may include any instrument by which a person may record or have recorded at least some observable information and thereby document this information relevant to the target. A rendering instrument may rely on human observations or input related to the topic. Examples of such instruments are pen, pencil, marker, ink, paper, paint, paintbrush, canvas, surface, tablet, mobile device, stylus, program used to prepare a digital rendering, or other such instruments.

While many types of recording devices may provide a representation, there are certain challenges associated with obtaining one or more representations of a selected target, and extracting relevant information from the representations and calculating the desired information.

One challenge associated with obtaining observable information regarding a selected target may include accessing the location of the target. Certain known systems address this challenge by setting up a recording device and operating such a device continuously, automatically, or remotely. However, if the person wishes to obtain observations regarding a large target or multiple targets that occur outside the range of a single recording device, positioning and maintaining multiple recording devices may be cost-prohibitive.

Other known systems address the challenge of obtaining desired representations by acquiring—including by way of purchase or license—from one or more third party sources one or more already-existing representations of a selected target. However, already-existing representations may not depict the entirety of the desired target or may not include representation creation information. For purposes of this application, the term "metadata" includes data regarding when the representation was created, from what angle the representation was created, in what weather conditions the representation was created, and other information relevant to the circumstances pursuant to which the representation was created.

In addition, acquiring information via already-existing representations may include searching for or requesting images regarding a target from a third party and then requiring human review of the images to identify information in those images. However, known procedures are often limited in the search/request parameters by which images may be found. Accordingly, while many images may be identified to the searcher, only some of the images may be relevant. The greater the number of irrelevant or useless images that are provided to the searcher, the more time and resources the searcher must utilize to find and be able to review the relevant images.

Some known procedures attempt to deal with irrelevant or useless images by providing a feedback mechanism that requests additional images to increase the sample size. However, while the feedback mechanism may provide additional images, because the search/request parameters may still be limited in scope or number, the additional pictures may have no higher likelihood of being relevant.

In certain circumstances, two or more observations may be necessary to provide the desired information, and accordingly, two or more representations may need to be created. In certain circumstances, the calculations of the desired information may be more accurate if the two or more representations are comparable. If not, then the content extracted from the representations must be balanced for comparability. However, as described above, obtaining comparable representations may be difficult. In addition, known techniques for balancing the comparability of the content extracted are often imprecise.

Even when comparable information is obtained, additional limitations are associated with displaying information in a quick and easy-to-understand format.

Clearly, there is a demand for an improved system and methods of obtaining, distilling, verifying, balancing, synthesizing, and coding information. The present invention satisfies this demand.

SUMMARY OF THE INVENTION

Certain embodiments of the present invention include first defining that which is the objective of the research exercise. The objective may be to find a detail about a target, answer a question, or define or collect other information. Once the first step is achieved, one embodiment of the present invention allows an assessment to be conducted whether the information can be found from a single known source. If not, the next step may be to determine what component information will be useful to generate the desired information or answer. The component information may include observable information and contextual information. Observable information is information that may be perceived by people alone or through systems or through a combination of both. Contextual information is all information that is either non-observable or, even if it is possible to observe the information, has been obtained in some way other than direct observation (e.g., maybe the primary source was an observation, but the observation was published, such as in a journal or book, so the direct source is the publication, not the direct observation).

At times, obtaining observable information about a topic requires capturing information in multiple locations or at multiple time points, for example, if certain topics have multiple components or are mobile. One way to obtain such information is to record the topic to permit location-remote or time-shifted viewing using a recording device.

By using a recording device, a representation—for example, visual or audio representation—is generated. Overall, in certain embodiments of the present invention, the purpose of obtaining and evaluating one or more representations is to extract what is termed "selected content" or "content information" from the representation, from which certain synthesized information can be gathered, collected, estimated, calculated, or determined. For example, in certain embodiments, the representations may be configured to depict retail or restaurant parking lots from which from which economic information or commercial information about the associated retail stores can be estimated. In other embodiments, the representations may be configured to depict coal stock piles or landfills from which volume information may be calculated and compliance information or environmental information can be determined. Certain embodiments include representations configured to depict progress of a construction site which may permit off-site monitoring and assess whether there is compliance with deadlines. Other embodiments include representations configured to depict onshore and offshore oil wells, onshore and offshore gas wells, factory parking lots which permit measuring employee traffic to predict factory output, commuter transportation parking lots which may permit assessing rail/bus use to track employment of the broader economy and regional transportation needs, factory inventory yards, wind turbines, car lots, construction machinery especially large machinery that gets produced and stored outside, large utility scale solar panel projects (e.g., First Solar projects in Mojave Desert), mines including pit activity, waste piles, and leach ponds, agricultural areas which may permit predicting size of harvest and health of the crops, ports which may permit monitoring shipping containers, commodities piles, and overall activity, hospital parking lots to track patient utilization, power plants to track activity including raw material resources including coal piles, dams, bridges, highways, or toll booths. Additional embodiments may be configured to track health, size, or quantity of animals or animal herds.

Certain embodiments also permit supplemental synthesized information to be gathered, collected, estimated, calculated, or determined. For example, if retail traffic result for a specific chain store is the first synthesized information and retail traffic result for a specific chain store is the second synthesized information, a combination of the first retail traffic result and second retail traffic result is an index of traffic results—or what is termed for purposes of this application as "supplemental synthesized information".

One embodiment of such an index may be formed by identifying a retail traffic result for big retailers (e.g., Wal-Mart, Home Depot, Lowe's, McDonald's) and weighting each retail traffic result by United States Revenue to correlate with the Bureau of Economic Analysis' Consumer Spending Index.

Another index embodiment may include a semiconductor index configured to track employment at semiconductor manufacturing and packaging plants around the world.

Also, a series of representations may be used to compare topics at different times, geographic locations, or vantage points.

In certain embodiments of the present invention, a search or request for a selection of representations generated from a camera is prepared. The search or request element includes criteria by which the results are refined. Such criteria may include resolution, pixilation, cloud cover, date of creation, date of modification, time of day of creation, type of camera, zoom in or zoom out, completeness of coverage of topic, removal of duplicate portions of target information, perspective from which representation was captured, or other conditions which were configured to maximize the relevance of the resulting selection of representations.

The selection of representations may be reviewed and verified for appropriate and accurate coverage of the target. If a certain threshold of irrelevant representations is met or exceeded, the system may dispatch an invitation to further refine the active criteria in the search/request component in an effort to improve the resulting representations.

Also, content information may be extracted from the selection of representations. Content information may be extracted manually by a human review of the representation, extracted automatically by a computer system, or some combination of human and system review. In certain embodiments, the extracted content information may be exported to a document, notification, or other output. Also, the extracted information may be distilled to further refine it based on relevance to the question or relatedness to the component information.

In certain embodiments, multiple units of extracted or distilled information are acquired. For example, one unit of distilled information may be content from a single representation or content from a plurality of representations (e.g., all representations captured on a particular day or at a particular location). Each unit of distilled information may be organized into classes. More specifically, in certain embodiments configured to measure information related to retail stores, each class of information may include all of the representations related to a certain chain of retail stores.

To further improve accuracy of information, each unit or each class of information may be balanced. Balancing the unit or class may include eliminating outliers, reducing imbalance from over or under sampling, randomizing and simulating multiple possible final datasets by systematically removing the imbalances in a random way or systematic way multiple times, weighting data points according to relevance, and applying coarsened exact matching statistical analysis. In certain embodiments, the balancing steps are conducted automatically by a computer system; while in other embodiments, a human may manage some or all parts of the balancing steps while the steps are occurring. The balancing steps may be configured to provide a high level of accuracy (e.g., between 80% and 84.5% accuracy, or between 80% and 90% accuracy) in order to answer a defined question or obtain the defined information.

The one or more balancing steps also may include generating synthesized information from a number of different combinations of component information. For example, if the component information from a group of representations includes a number of figures that may or may not be considered outliers by certain statistical methods, a number of synthesis steps may be conducted. For example, with respect to figures "A", "B", "C", and "D", a first synthesis step may include synthesizing all figures A, B, C, and D. A second synthesis step may include synthesizing figures A, B, C, and not D (if, for example, D is an outlier under the quartile method). A third synthesis step may include synthesizing all figures A, B, D, and not C (if, for example, C is an outlier under the z-score method). Additional balancing steps may calculate the synthesized information based on other statistical methods. The director of this process may choose one of the synthesized information sets as the final synthesized information or may combine or compare two or more synthesized information sets to generate a supplemental synthesized information set.

The balanced content information may then be synthesized with contextual information. Examples of contextual information include population statistics regarding certain regions, e.g., towns, villages, cities, counties, states, all of which may include total number of people, number of females or males, population density, population growth predictions, average family size, age distribution of population, education level of population, income level for population, disposable income for population, race distribution of population, average number of people per household, and average number of vehicles per household. In other embodiments, contextual information includes coal storage statistics, legal compliance requirements for landfills, crop growth rates, construction progress plans, capacity of shipping containers, production capability of oil refineries and oil rigs, supply and demand formulas, stock market and other market predictions, or other information not derived from a representation.

The resulting synthesized information may be configured to efficiently address the defined question. Not only may the answer to the defined question be provided, in certain embodiments, an accuracy score may be provided as well. Advantageously, consumers may be provided with sufficient information so that they understand the value and reliability of that which was provided compared to that obtained from other sources.

Certain embodiments of the present invention may be configured to generate synthesized information such as economic comparables by calculating the sum of traffic growth, average ticket growth, and shopper conversion rate growth. Also, synthesized information may be compared to various sources. For example, financial traders may compare the synthesized information configured as a result of the system and methods of the present invention to other sources of market information. Other market analysts may wish to obtain information not just about individual retail locations or chains, but the retail market as a whole or a location as a whole. Long term investors may wish to track multiple retail chains over a long period of time. Quant funds may use the synthesized information as data inputs for their own proprietary market analysis models.

Accordingly, the synthesized information may include information: about fill rates of parking lots; market share percentage of a particular retail store in a certain geographic location; consumer confidence levels; trends in retail store revenues over time or over region; composition of same-store sales, same-store transactions, or same-store traffic at one or more retailers; market share shifts in one or more geographic locations at one or more retailers which may be measured as "share of vehicles" over a specific time period (total vehicles at retailer A/total vehicles at retailer A+retailer B+retailer N . . . ); conversion rates or "close rates" of vehicles in the parking lot versus actual transactions measured by the store itself (e.g., number of transactions in +/−15 minute period surrounding the timestamp of the image divided by the number of vehicles measured in the representation); employment trends for the economy as a whole or for a specific company; production/inventory trends for a specific company; historical traffic trends to monitor geographical "hot spots" for new store development; or effectiveness of a promotion, advertisement, remodeling project, or other occurrence. Other examples of synthesized information may include whether and for how long certain ships are docked in a port, quantity of coal in a coal pile, and volume of waste in a landfill.

After generating the synthesized information, it may be formatted for possible dispatch or distribution to another entity. The formatting may include producing a report having numeric displays and optionally graphical displays of the synthesized information.

One embodiment of the present invention directed to the question of location, number, and size of solar panels includes the following steps:

1. Determine zip code for analysis;
2. Acquire county address points and QC with county parcel layer to ensure accuracy (i.e. all points fall within only one parcel);
3. Create satellite imagery acquisition area of interest through intersection of address points with zip code boundary;
4. Acquire satellite imagery;
5. Acquire higher resolution auxiliary aerial imagery for use as a second opinion (Bing Maps);
6. Overlay all datasets in GIS system;
7. Cycle through each address point and check, for example, for solar panels;
8. If solar panels are present, mark as "1", If not present, mark as "0", If unclear, mark as "2";
9. For each solar panel present, measure the square footage and mark in spreadsheet;
10. Complete analysis on all address points; and
11. Export spreadsheet to a program.

In certain embodiments, the synthesized information is coded and displayed for easy review and quick understanding of the answer to the defined question. For example, in certain embodiments, the coding step may include assigning to a set of synthesized information a symbol such as a number, letter, color, or other character. In certain embodiments, the coding step(s) may include assigning two symbols to each set of information (e.g., a number and a color or a letter and a color). Other embodiments may utilize a plurality of symbols. Also, certain embodiments may include a first symbol and a second symbol associated with each data point. In addition, the coded information may be displayed in association with the raw data or without the raw data.

Certain embodiments of a method according to the present invention may include a series of processing steps. Certain such embodiments may be configured to provide yearly comparison of content information related to one or more retail stores. For example, the processing steps may include:

Selecting dates for year-over-year comparable period;
Choosing retailers;
Picking parameters for cloud cover and satellite collection angles;
Deciding on locations for output files such as script output files;
Running GIS operations;
Identifying imagery that intersects all retailers
    Within the previous selection, sub-selecting data which has a cloud cover of less than 70% across the full image;
    Within the previous selection, sub-selecting data which has a average panchromatic resolution of less than 0.85 centimeters per pixel;
    Within the previous selection, sub-selecting data which matches the correct dates needed based on the question;
Writing selection to new feature;
Unifying (combining) retailers and imagery features together into a new feature;
Dissolving (e.g., merge overlapping retail location) features based on spatial overlap and common fields: "Ticker", "Address", "State", "Store_OID", "Zip", "CATALOGID", "ACQDATE", "AVPANRES", "BROWSEURL", "CLOUDCOVER", "Latitude", "Longitude";
Sorting features by lowest to highest panchromatic resolution;
Calculating and removing duplicate retail observations (stores imaged twice or more on the same day);
Dissolving (or eliminating) again based on fewer common fields only found in imagery metadata: "CATALOGID", "ACQDATE", "AVPANRES", "BROWSEURL", "CLOUDCOVER";
Finding and deleting over sampled observations from a subset of retailers (for example: AutoZone, Starbucks, Walmart);
Calculating the area of each remaining feature/observation;

Detecting and removing observations that are less than 2 square kilometers and over 40% covered by clouds;

Ascertaining and deleting all observations that are less than 1.5 square kilometers;

Buffering all observations under 3 square kilometers so they become larger than 3 square kilometers;

Counting all remaining features by date of acquisition; and

Sending all remaining features to satellite company for order placement.

One advantage of certain embodiments of the present invention is to permit maximizing the relevance of the selection of representations obtained.

Another advantage of certain embodiments of the present invention is to permit verifying the significance of the selection of representations obtained.

Another advantage of certain embodiments of the present invention is to eliminate or reduce the number of feedback loops needed (relative to known procedures) since the process may be reducible from the earlier search/request steps.

Another advantage of certain embodiments of the present invention is to enhance comparability of content extracted from representations by balancing the content information.

Another advantage of certain embodiments of the present invention is to efficiently generate synthesized information about targets that may be difficult to observe from a non-aerial perspective.

Another advantage of certain embodiments of the present invention is to efficiently generate synthesized information with increased accuracy.

Another advantage of certain embodiments of the present invention is to code and display the synthesized information in a quick-to-perceive and easy-to-understand manner.

Another advantage of certain embodiments of the present invention is that the display interface illustrates only coded, easy to read information and does not clutter the interface with non-essential information.

The present invention and its attributes and advantages will be further understood and appreciated with reference to the detailed description below of presently contemplated embodiments, taken in conjunction with the accompanying drawings.

DESCRIPTION OF THE DRAWINGS

The preferred embodiments of the invention will be described in conjunction with the appended drawings provided to illustrate and not to the limit the invention.

FIG. 3A-FIG. 3H, FIG. 3J-FIG. 3N, and FIG. 3P illustrate embodiments of reports or components of reports.

FIG. 4A-FIG. 4G illustrate graphical displays of information related to a topic.

FIG. 5A-FIG. 5H, FIG. 5J-FIG. 5N, and FIG. 5P illustrate representations and, in certain embodiments graphical and textual displays, configured to show content information or synthesized information.

DETAILED DESCRIPTION OF SPECIFIC EMBODIMENTS OF THE INVENTION

Figure 1A:
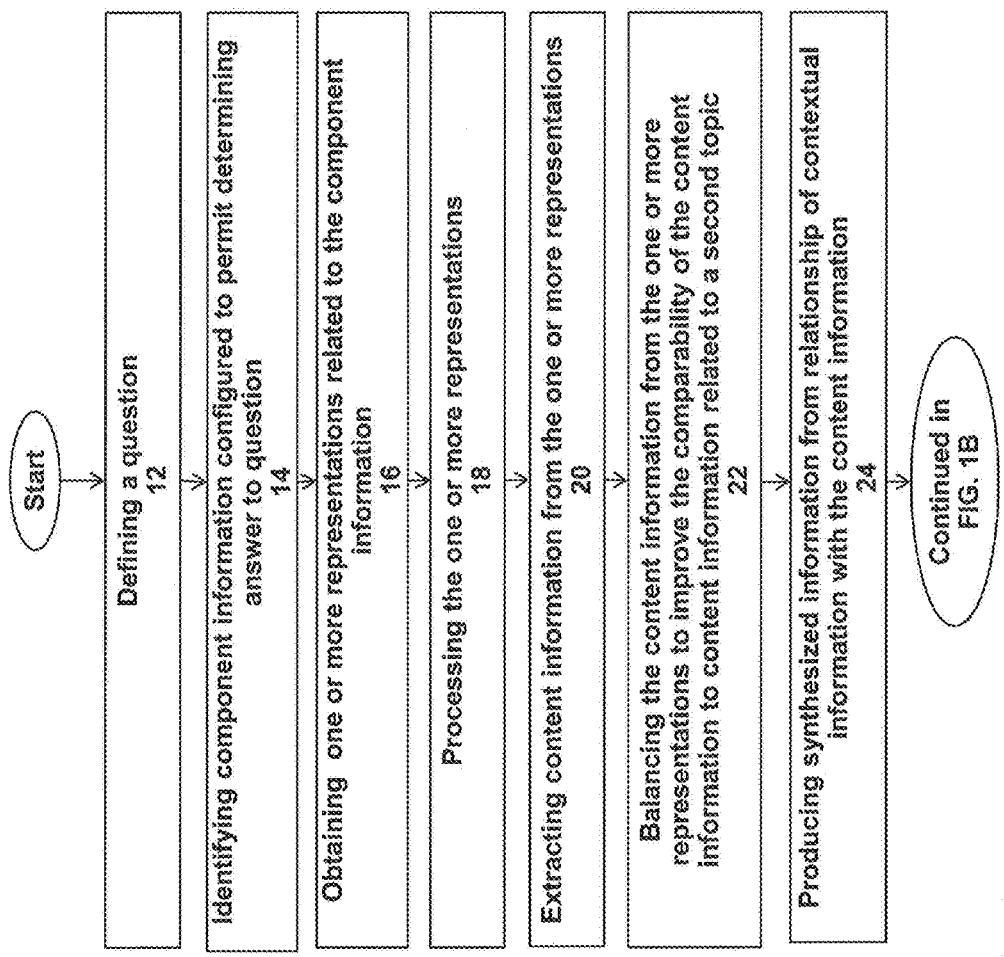
FIG. 1A and FIG. 1B illustrate flowcharts of one certain method embodiment of the present invention.
Figure 1B:
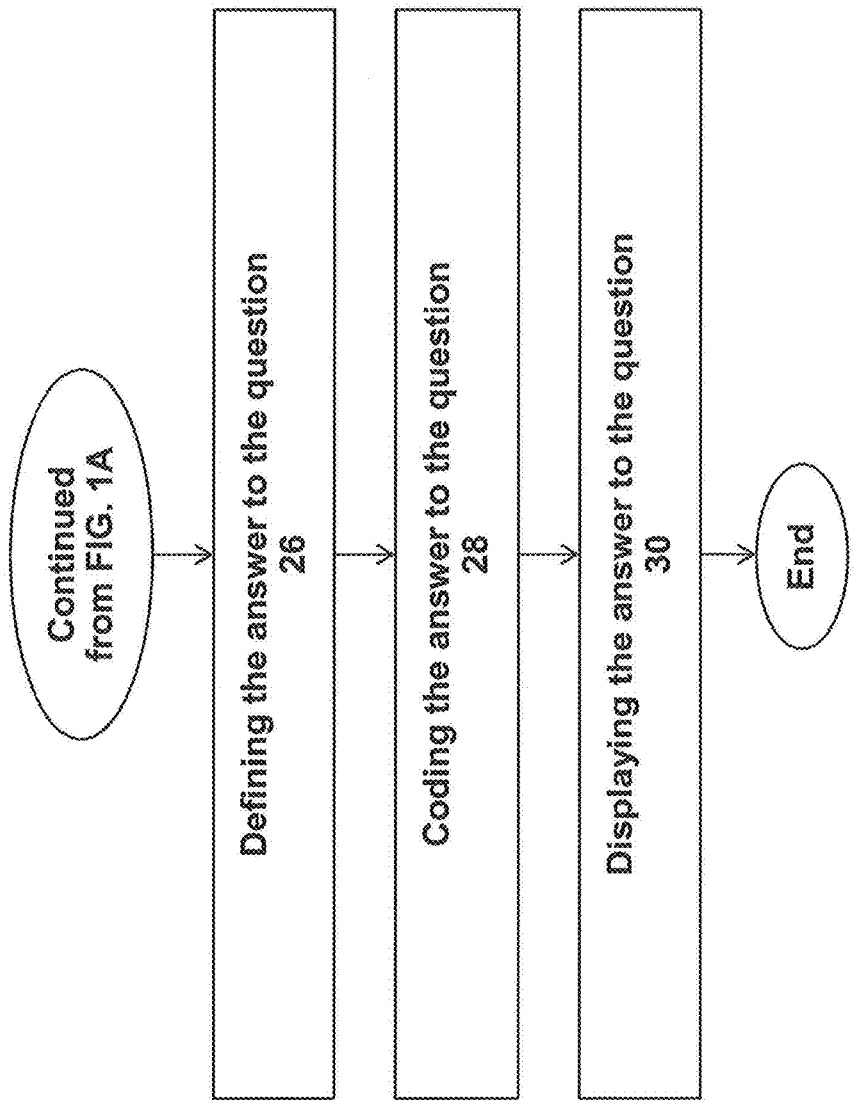

FIG. 1A and FIG. 1B illustrate certain embodiments of methods according to the present invention.

In FIG. 1A, one of the preferred embodiments according to the present invention is illustrated. The user may first define a question or topic for which information is sought (also collectively termed "question") 12 and then identify sources of component information that may provide the answer to the question 14. One or more representations related to the question may be obtained from the available component information 16. The one or more representations that are obtained may then be processed 18. From the one or more representations that may be processed, content information may be extracted 20. To the extent required, the extracted content information may then be balanced to facilitate the comparability of the content information from topic to topic 22. Contextual information may be then combined (or "synthesized") with the content information to produce synthesized information 24.

With referenced to FIG. 1B, from the synthesized information—or the supplemental synthesized information, the latter of which may be formed from a combination of two or more bodies of synthesized information, an answer to the question may be obtained 26. The synthesized information or supplemental synthesized information may then be coded to facilitate the quick review and understanding of the information 28. The coded information—the "answer"—may then be displayed 30.

Figure 2:
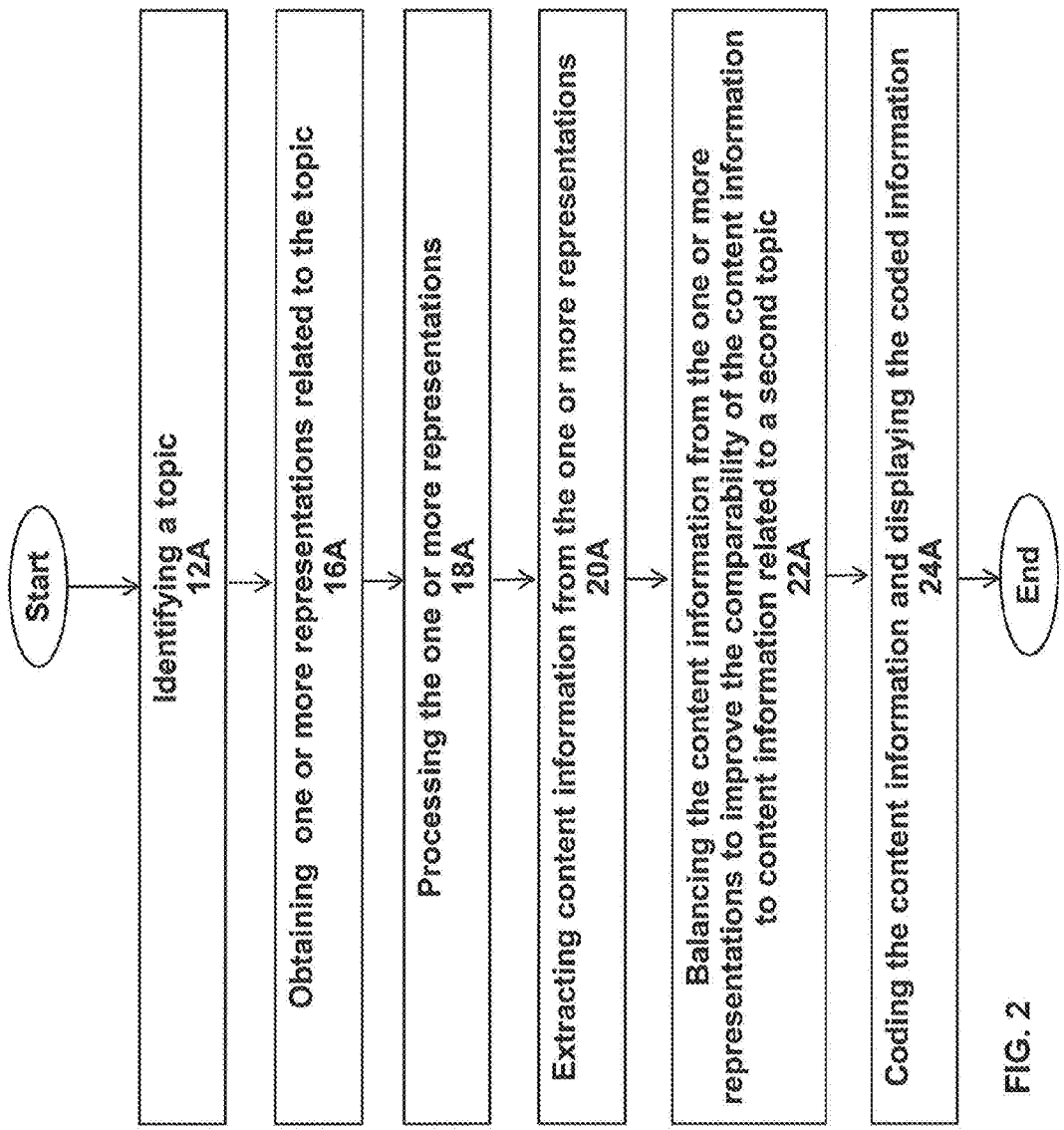
FIG. 2 illustrates a flowchart of another method embodiment of the present invention.

FIG. 2 illustrates an embodiment of the present invention similar to the embodiment shown in FIG. 1A and FIG. 1B. In this FIG. 2 embodiment, a topic is identified by a user 12A, one or more representations regarding that topic are obtained from one or more sources or system 16A, the one or more representations are processed 18A, content information may be extracted from the one or more representation 20A, the content information may then by balanced 22A, and the content information coded for quick and efficient review and display 24A.

Figure 3A:
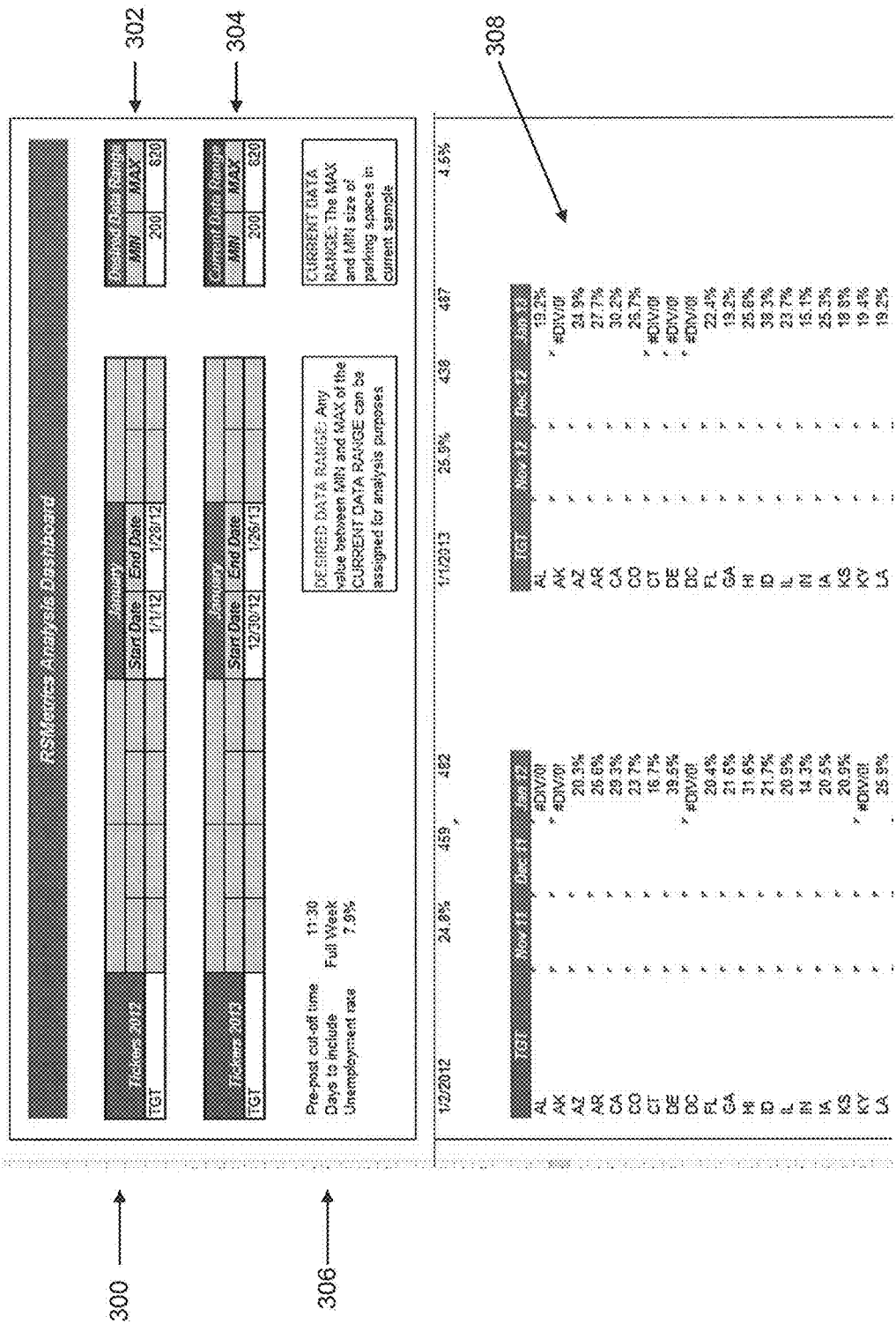

FIG. 3A-FIG. 3H, FIG. 3J-FIG. 3N, and 3P illustrate certain of the specific embodiments of the reports or components of reports that may be generated through the use of the present invention. FIG. 3A illustrates one embodiment of the overall Analysis Dashboard 300. Through dashboard 300, a user may input the desired minimum and maximum data range for the representations analyzed 302. The current data range may be, for example, the size of the minimum and maximum number of parking spaces contained within the sample 304. A time period may be selected by a user for the report 306. The associated statistics of the subtopic for the selected time and location indicated may be then reported 308.

Figure 3B:
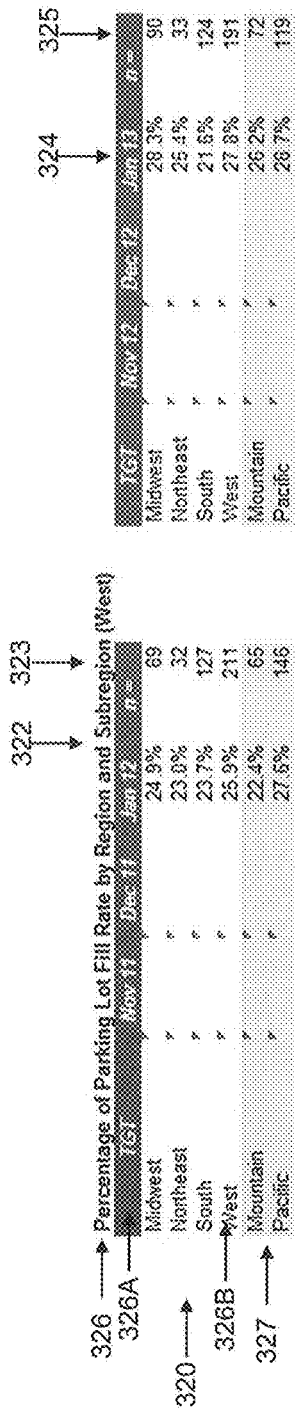

FIG. 3B illustrates another of the many specific embodiments of a component of a report 320 that may be generated through the use of the present invention for a specific topic 326. The report may be configured to provide specific statistics 322, 324 for a given sample number or representations analyzed 323, 325 for a certain topic or question 326—"Percentage of Parking Lot Fill Rates by Region and Subregion (West)"—or focusing on a certain aspect or subtopic 326A—"TGT"—and regions 326B—various regions—and focusing through color coding 327 of a certain region—"Mountain Pacific".

Figure 3C:

FIG. 3C illustrates another specific embodiment of a component of a report 330 that may be generated through the use of the present invention. The component of the report 330 is another example of specific statistics 332, 334 regarding a certain topic or question 336—"Distribution of Parking Lot Fill Rates"—and subtopic or subtopics 336A—"TGT" and 336B—percentage ranges.

Figure 3D:
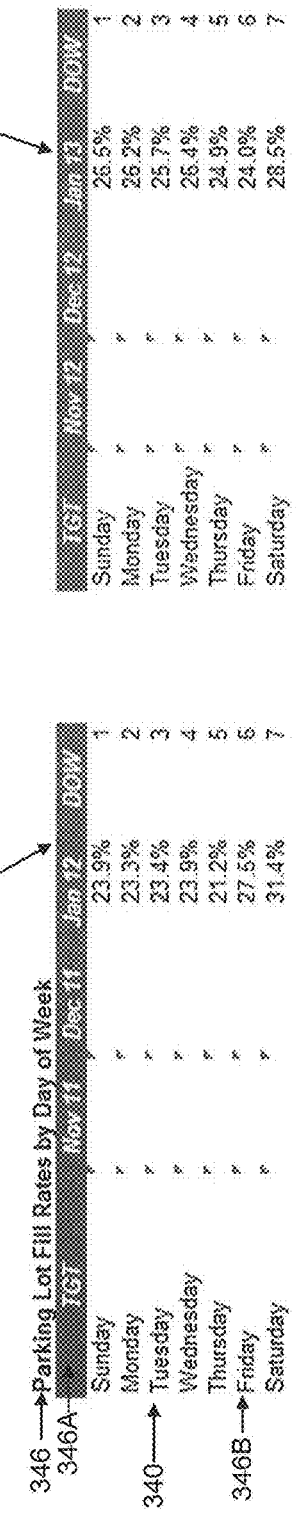

FIG. 3D illustrates another specific embodiment of a component of a report 340 that may be generated through the use of the present invention. The component of the report 340 is another example of specific statistics 342, 344 regarding a certain topic or question 346—"parking Lot Fill Rates by Day of Week"—and subtopic 346A—"TGT"—and subtopic, 346B—days of week.

FIG. 3E-FIG. 3N each illustrate additional specific embodiments of reports that may be generated through the use of the present invention to provide certain statistics for a certain topic and a certain subtopic.

FIG. 3E illustrates report 350E providing statistics 352E for topic 356AE—"parking lot fill rate by percentage of minority presence"—for subtopics 356BE1—"TGT"—and 356BE2—specific dates.

FIG. 3F illustrates report 350F providing statistics 352F for topic 356AF—"parking lot fill rate by presence of under 18 population"—for subtopics 356BF1—"TGT"—and 356BF2—specific dates.

FIG. 3G illustrates report 350G providing statistics 352G for topic 356AG—"parking lot fill rate by presence of unemployment"—for subtopics 356BG1—"TGT"—and 356BG2—specific dates.

Figures 3H, 3J:
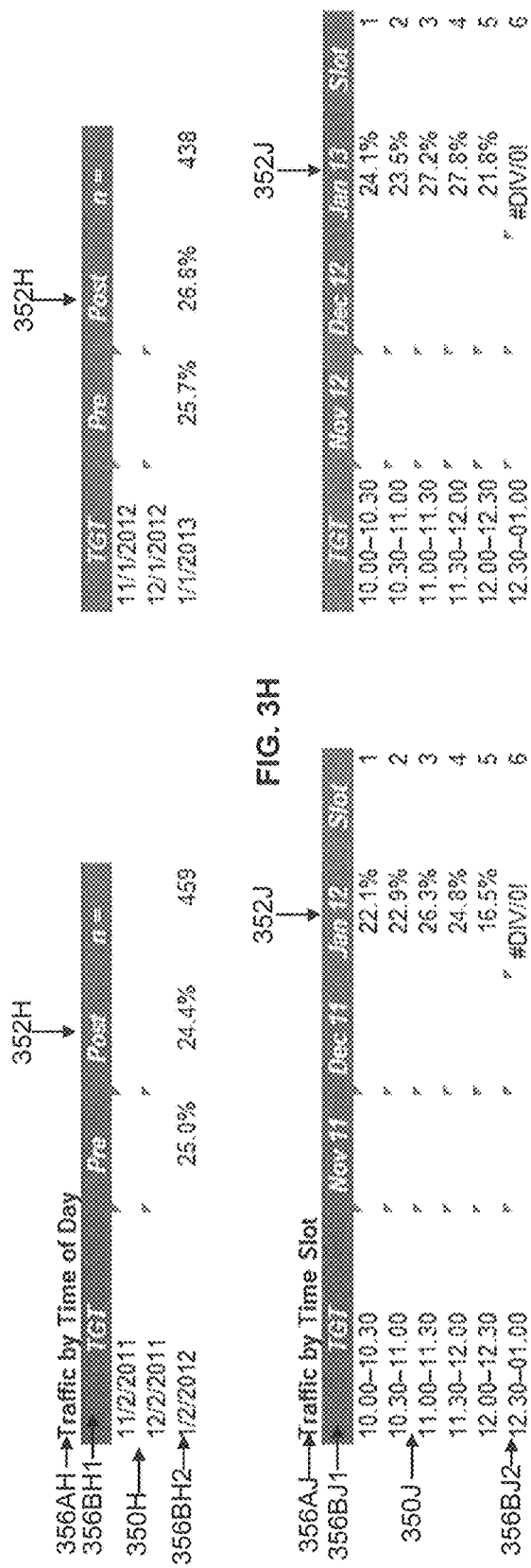

FIG. 3H illustrates report 350H providing statistics 352H for topic 356AH—"traffic by time of day"—for subtopics 356BH1—"TGT"—and 356BH2—specific dates.

FIG. 3J illustrates report 350J providing statistics 352J for topic 356AJ—"traffic by time slot"—for subtopics 356BJ1—"TGT"—and 356BJ2—specific dates.

Figure 3K:
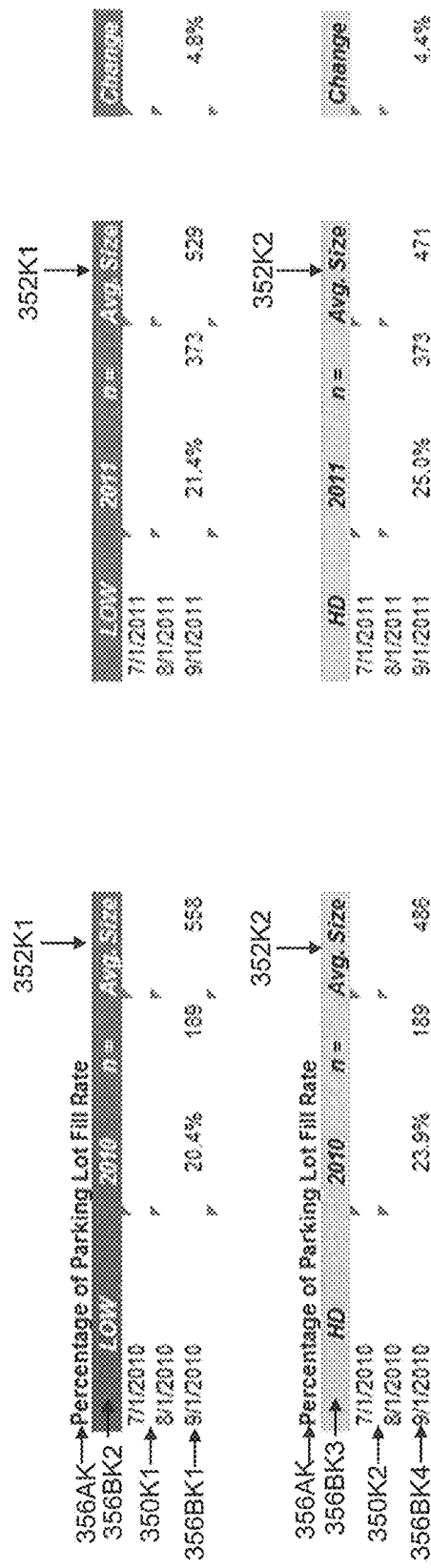

FIG. 3K illustrates report 350K1 providing statistics 352K1 and report 350K2 providing statistics 352K2 regarding a certain topic 356AK—"percentage of parking lot fill rate"—for subtopics 356BK1 and 356BK4—specific dates—and 356BK2—"Low"—and 356BK3—"HD".

Figure 3L:
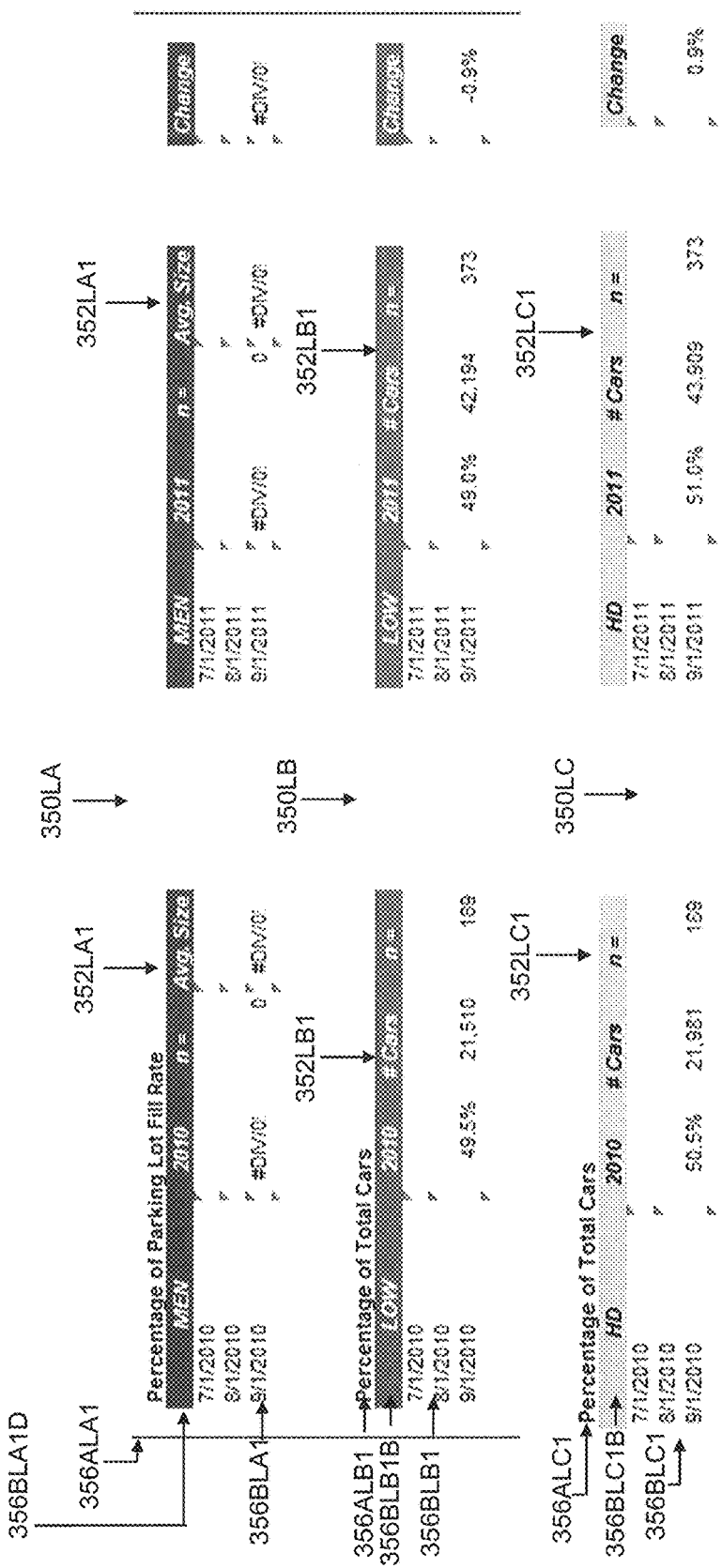

FIG. 3L illustrates certain related reports. Report 350LA provides statistics 352LA1 regarding topic 356ALA1—"percentage of parking lot fill rate"—for certain subtopic 356BLA1—specific dates—and 356BLA1D—"MEN". Report 350LB provides statistics 352LB1 for certain topic 356ALB1—"percentage of total cars"—for certain subtopics 356BLB1—specific dates—and 356BLB1B—"Low". Report 350LC provides statistics 352LC1 for the certain topic 356ALC1—"percentage of total cars"—and certain topic 356BLC1—specific dates—and a subtopic 356BLC1B—"HD".

Figure 3M:
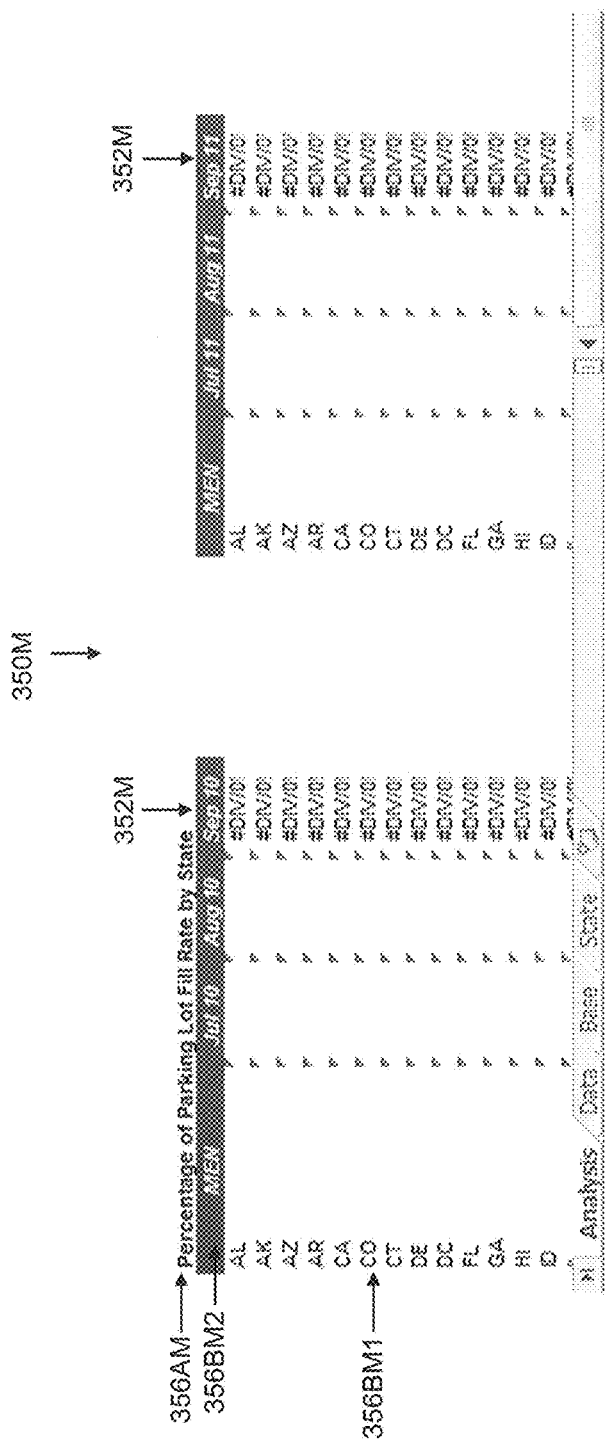

FIG. 3M illustrates report 350M that provides statistics 352M for topic 356AM—"percentage of parking lot fill rate by state"—for subtopics—356BM1—various selected states—and 356BM2—"MEN".

Figure 3N:
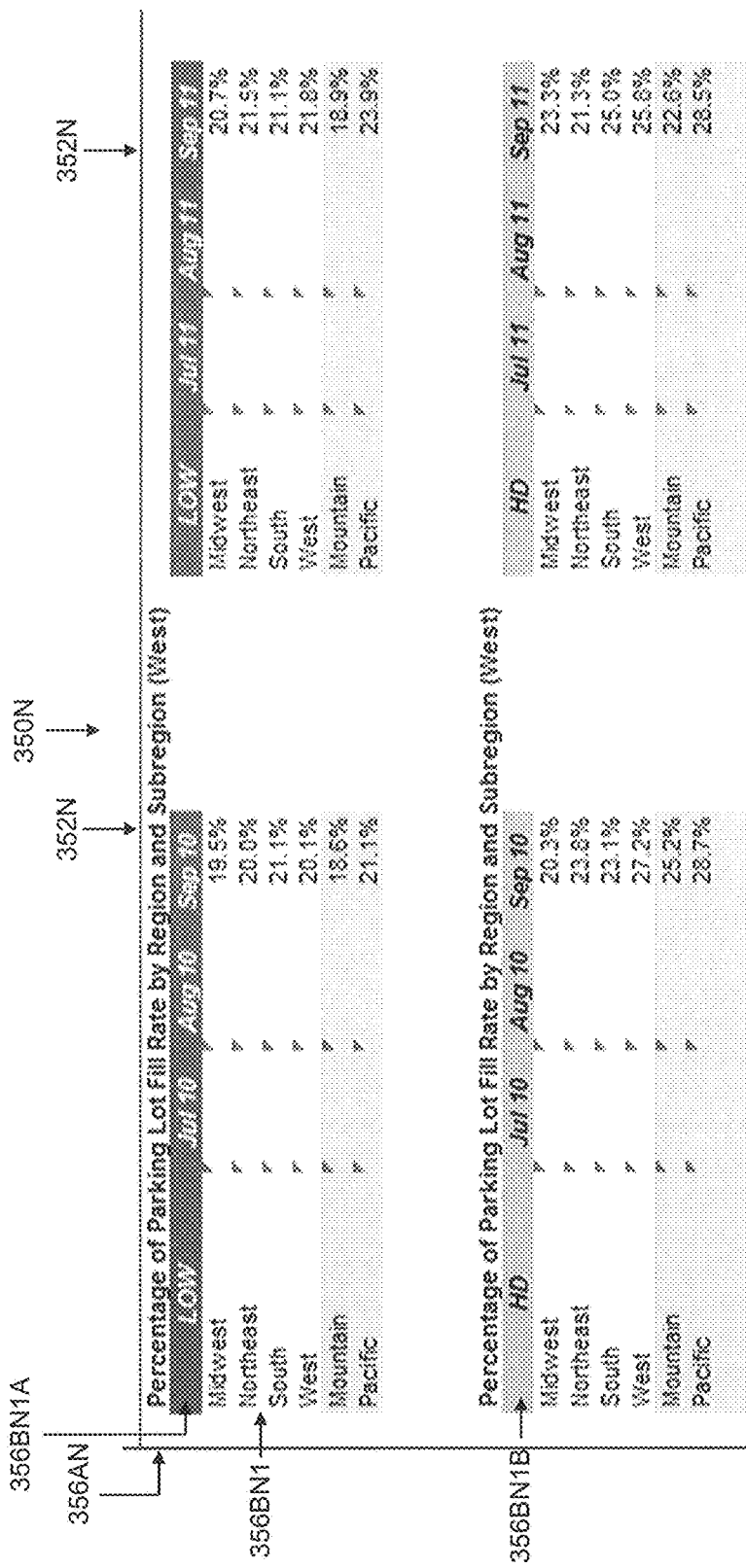

FIG. 3N illustrates reports 350N that provides statistics 352N for the same topic 356AN—"percentage of parking lot fill rate by region and subregion (West)—with respect subtopics 356BN1—various regions—but different additional subtopics 356BN1A—"Low" and 356BN1B—"HD".

FIG. 3P illustrates report 350P. All raw data contains metadata relevant to the representation including the location, time and description of the location, number of car counts, number of spaces and other information.

FIG. 4A-FIG. 4D illustrate other embodiments of reports or components of reports that may be generated through the use of the present invention. The illustrated reports are displayed as graphical representations of information related to specific topics determined by the user input.

Figure 4A:
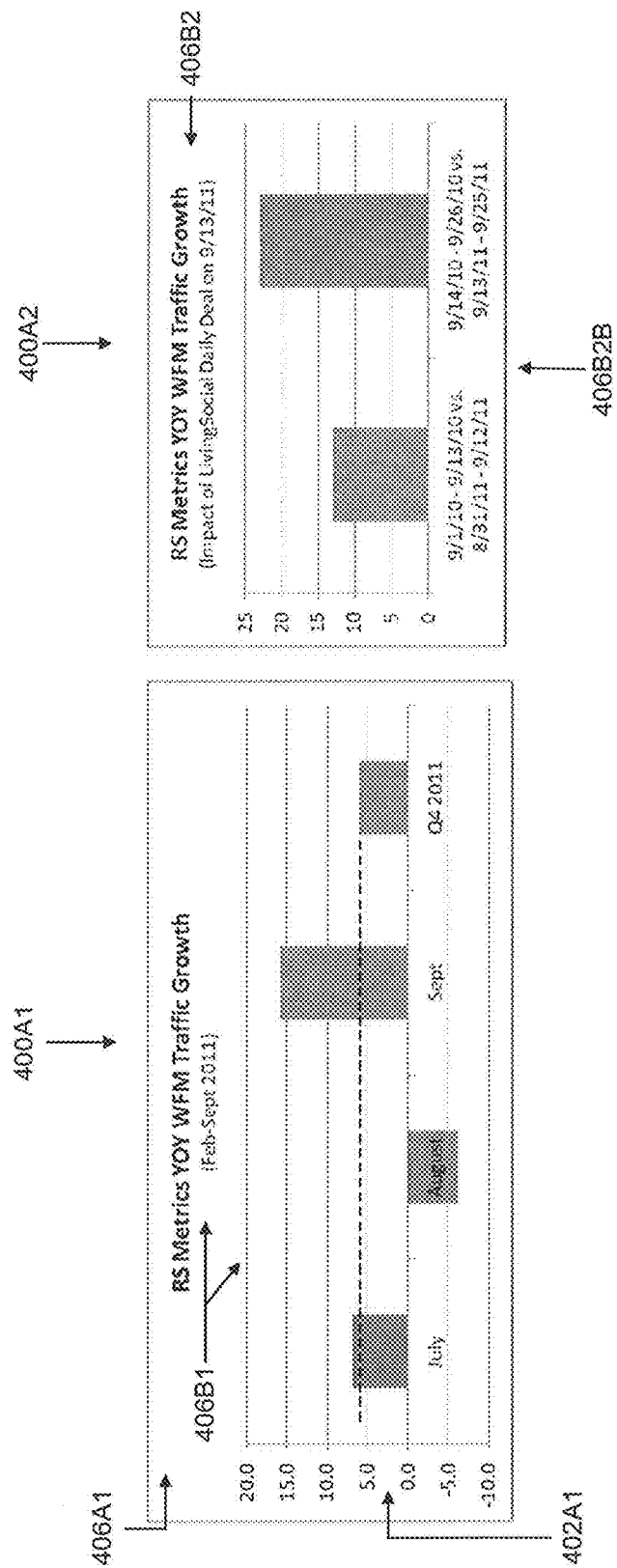

FIG. 4A illustrates a specific embodiment of components of a report 400A1, as graphically displayed to show specific statistics 402A1—percentages relevant to a topic 406A1—"RS Metrics YOY WFM traffic growth"—for a certain subtopic 406B1—certain time periods. FIG. 4A illustrates also report 400A2—the same topic as in report 400A1—but providing statistics regarding a different subtopic 406B2—"Impact of Living Social Daily Deal on Sep. 13, 2011"—and subtopic 406B2B—different dates.

Figure 4B:
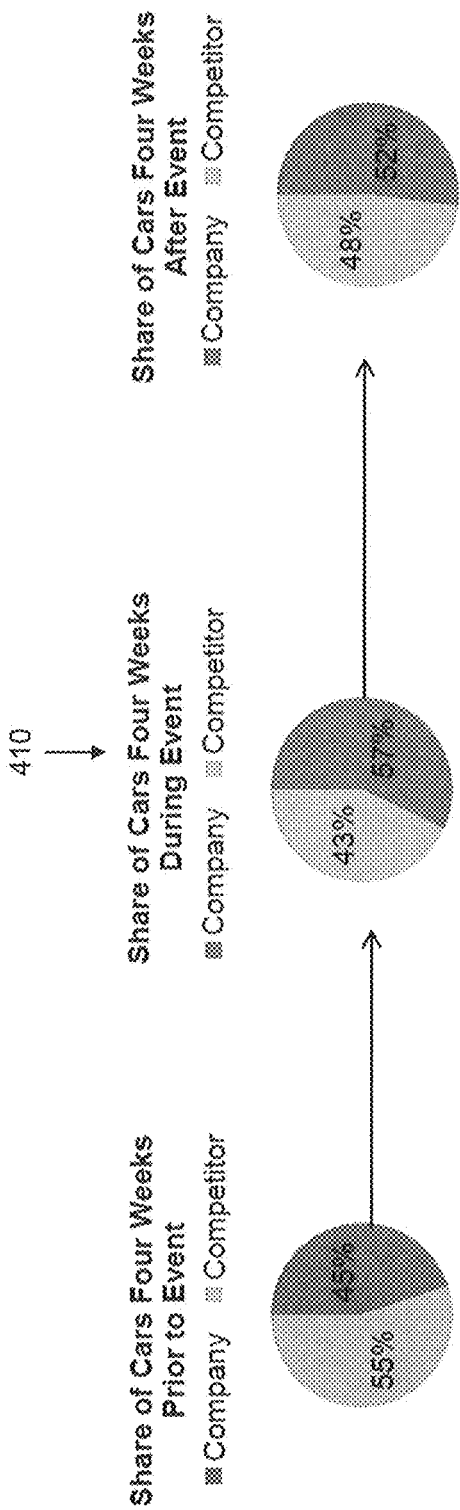

FIG. 4B illustrates a specific embodiment of components of a report 410, and provides specific statistics associated with particular subtopics of interest.

Figure 4C:
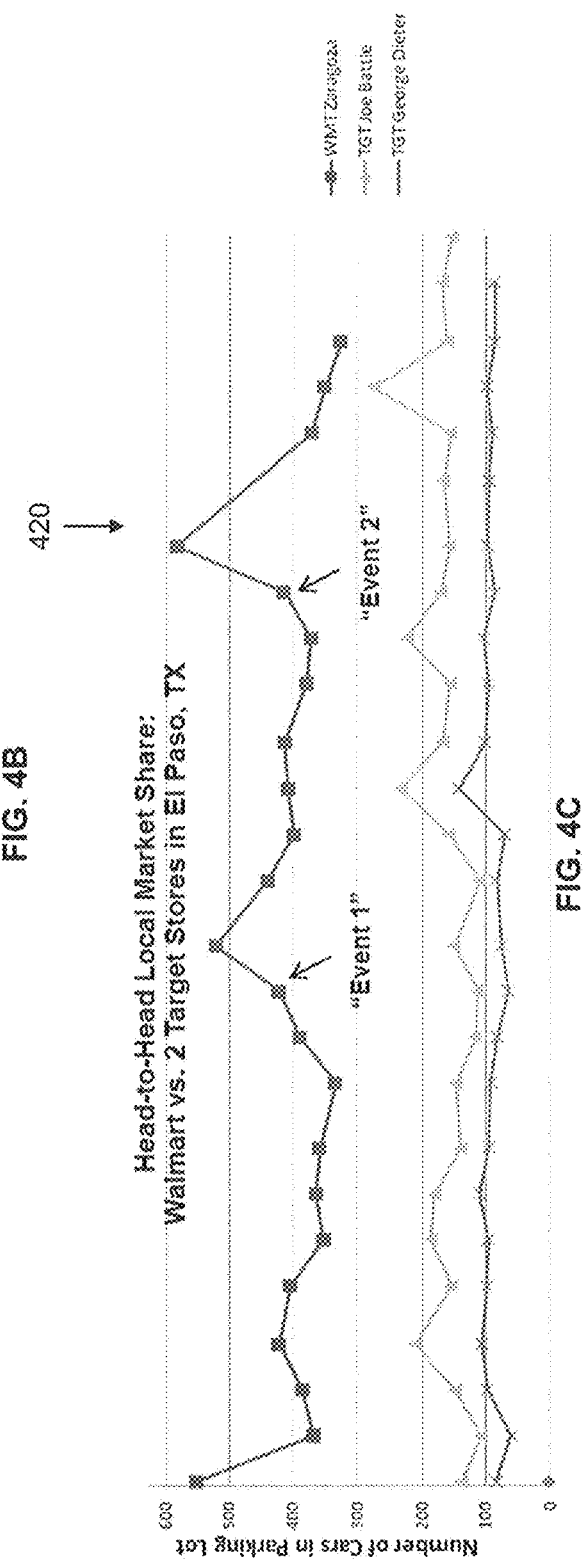

FIG. 4C illustrates a specific embodiment of components of a report 420, and provides specific statistics associated with particular subtopics of interest.

Figure 4D:
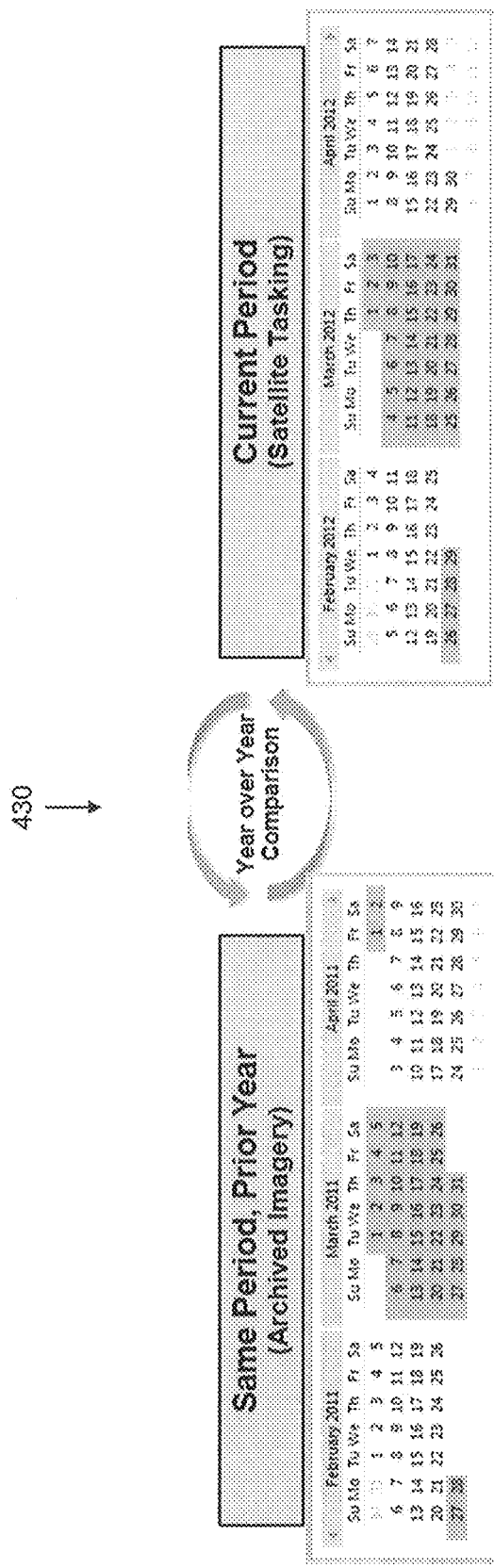

FIG. 4D illustrates a specific embodiment of components of a report 430, and provides specific statistics associated with particular subtopics of interest.

These reports illustrate that embodiments of the invention may be used to generate reports in which different colors may be utilized to different portions of the information included in a report in order to facilitate the efficient display and review of the report. For example, different rating levels may be assigned to different topics.

Figure 4F:
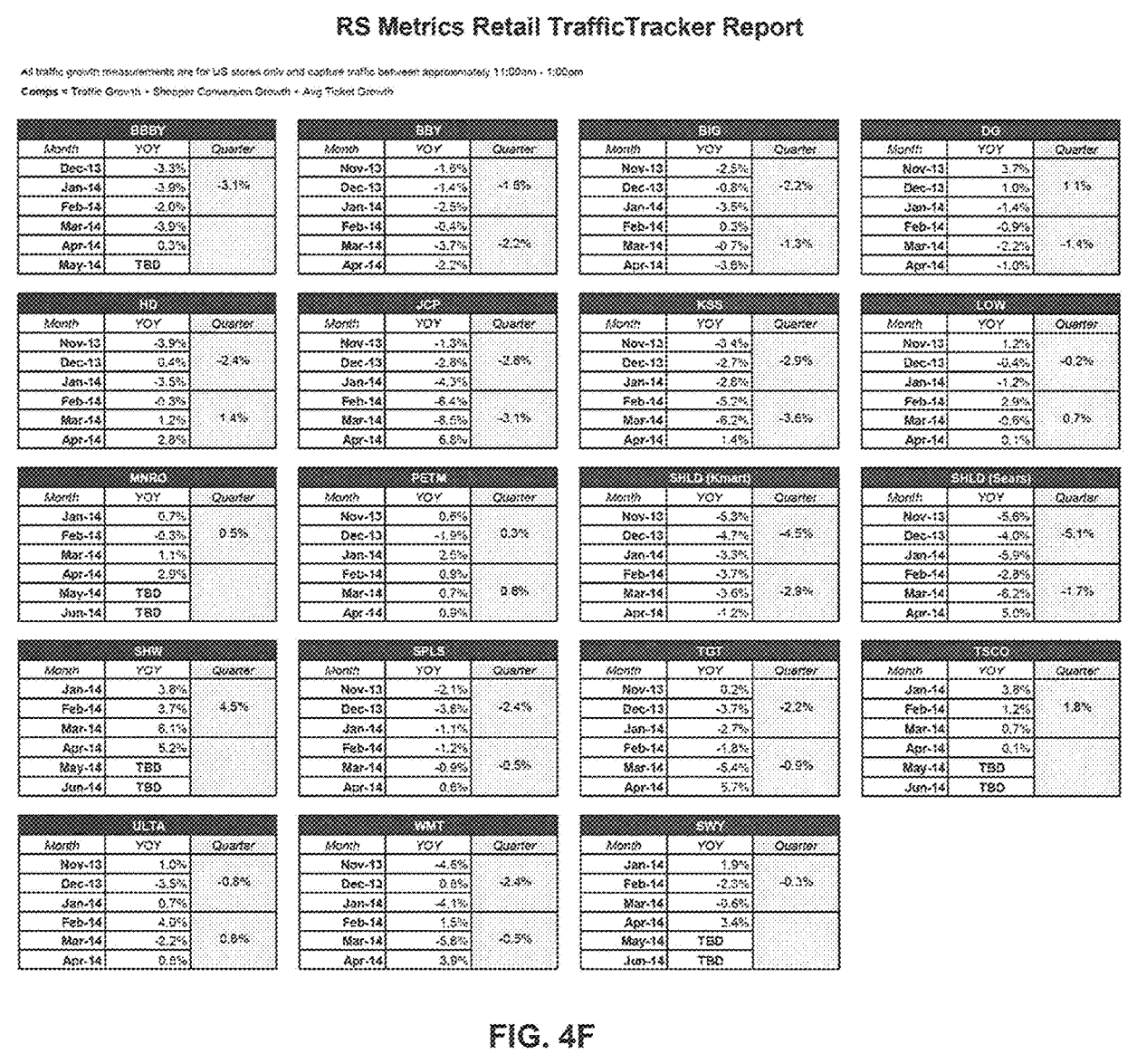

FIG. 4E-4G illustrate other embodiments of reports that may be generated through the use of the present invention. In FIG. 4E rather than the year-over-year ("yoy") traffic number presented as a range for a quarter, the active yoy traffic number for a day, week, month, quarter, or historical averages over any other specified time period (e.g. a rolling 30 or 60 day average) can be shown. In addition, for a selected company or companies, and for a selected reporting period (day, week, month, quarter, historical averages over other time periods, and year), the report may provide a "score" that identifies the standard deviation of traffic growth for the current time period ((day, week, month, quarter, historical averages over other time periods, and year) versus the historical traffic growth average. Additionally, the report may provide a historical model that shows the stock price for a selected company or companies, and a calculation of the return that would have been generated after a period of time (e.g. 30 or 60 day rolling average) if a stock trade were made in the same direction (long or short) as the direction of the standard deviation score.

Figure 5A:
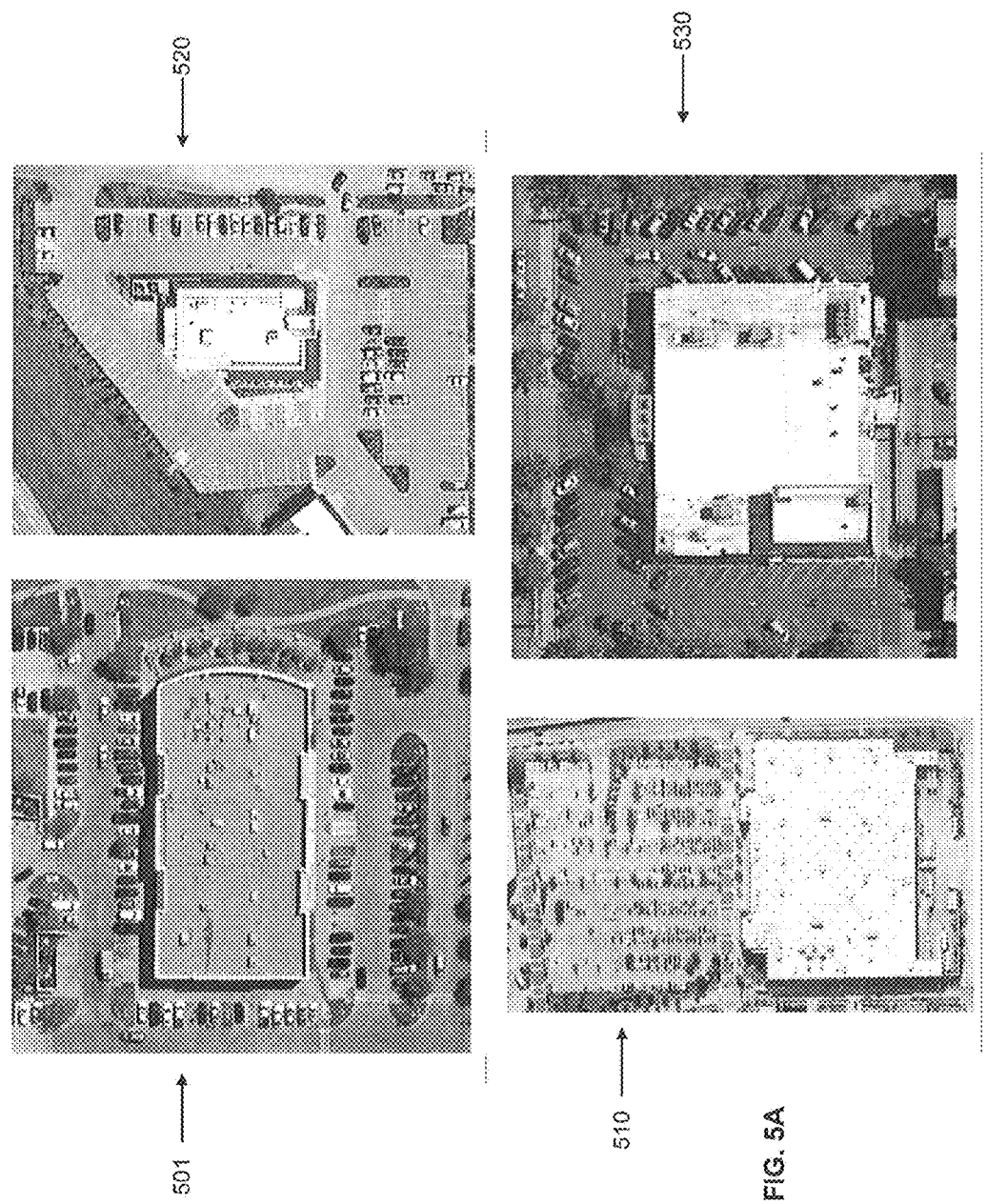
Figure 5B:

FIG. 5A-FIG. 5B illustrate some of the representations of the certain content information that may be obtained for further evaluation.

FIG. 5A illustrates various examples of representations in which content information may be obtained 501, 510, 520, 530.

FIG. 5B illustrates one specific example of a representation—an area of coal pilings—in which content information may be obtained 550.

FIG. 5C-FIG. 5H, FIG. 5J-FIG. 5N illustrates example embodiments of reports or components of reports that may be generated through the use of the present invention. The illustrations show displays of a combination of representations and statistical information related to specific topics and subtopics determined by the user input.

Figure 5C:
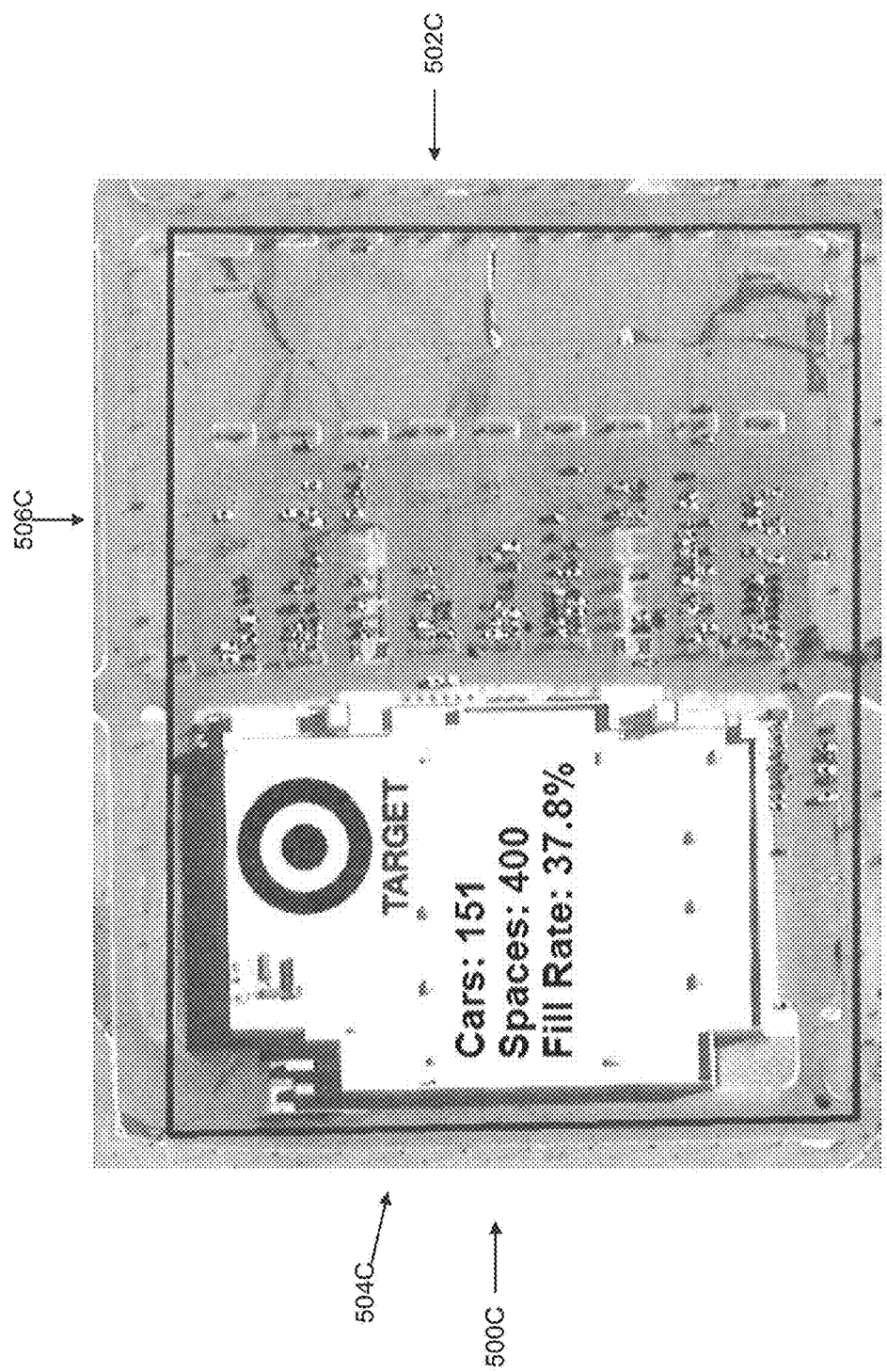

FIG. 5C illustrates an example embodiment of a report or component of a report 500C, as displayed as a combination of a representation 502C and statistical information 504C related to specific topics and subtopics determined by the user input. In the report 500C, specific component information coded in color is identified as 506C.

Figure 5D:
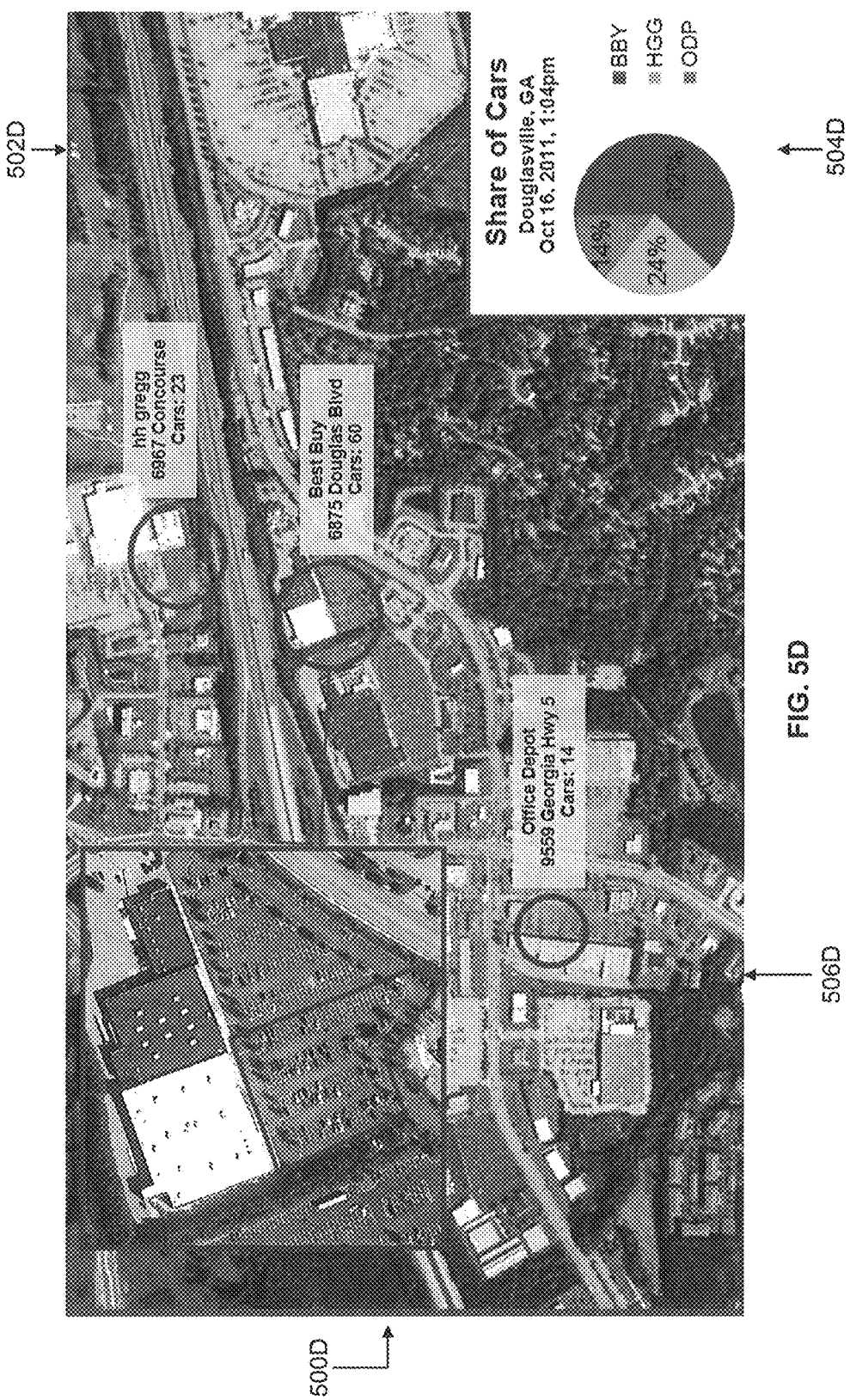

FIG. 5D illustrates an example embodiment of a report or component of a report 500D, as displayed as a combination of a representation 502D and statistical information 504D related to specific topics and subtopics determined by the user input. In the report 500D, specific component information is coded through lining and color and text added and is identified as 506D.

Figure 5E:
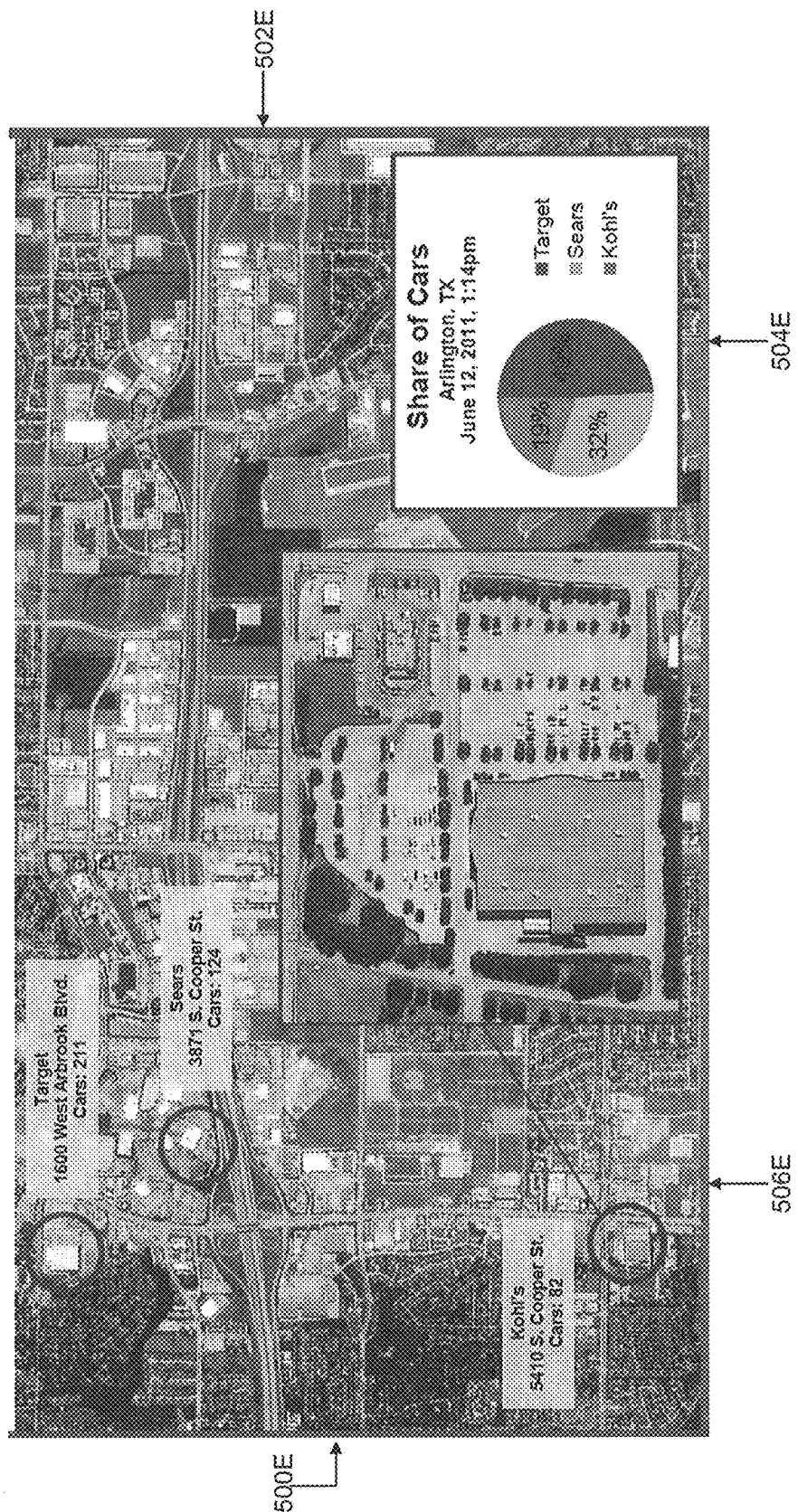

FIG. 5E illustrates an example embodiment of a report or component of a report 500E, as displayed as a combination of a representation 502E and statistical information 504E related to specific topics and subtopics determined by the user input. In the report 500E, specific component information is coded through lining and color and text added and is identified as 506E.

Figure 5F:
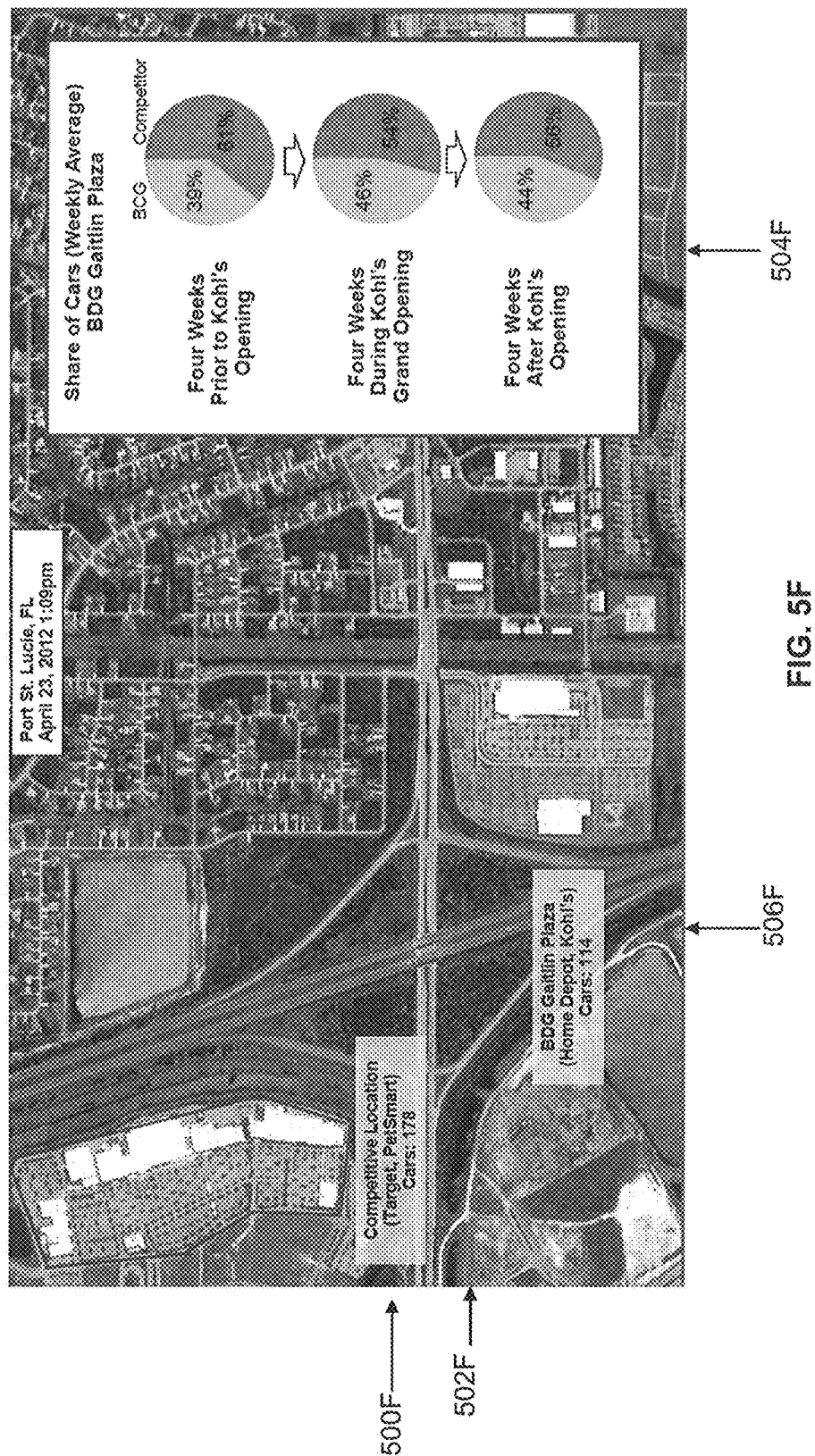

FIG. 5F illustrates an example embodiment of a report or component of a report 500F, as displayed as a combination of a representation 502F and statistical information 504F related to specific topics and subtopics determined by the user input and including coding 506F.

FIG. 5G illustrates an exemplary embodiments of a report 500G generated through the use of the present invention showing a combination of a representation 502G and statistical information 504G related to specific topics and subtopics selected by the user input. In the report 500G, specific component information is coded and identified as 506G.

Figure 5H:
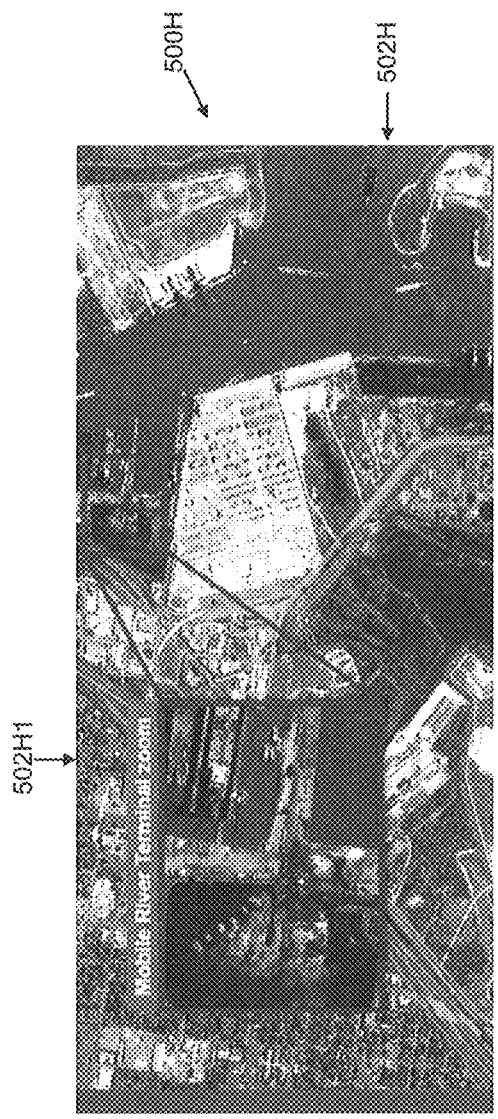

FIG. 5H illustrates another embodiment of a report 500H generated through the use of the present invention showing a combination of a representation 502H and an additional selected portion 502H1 of the representation magnified and identified.

Figure 5J:
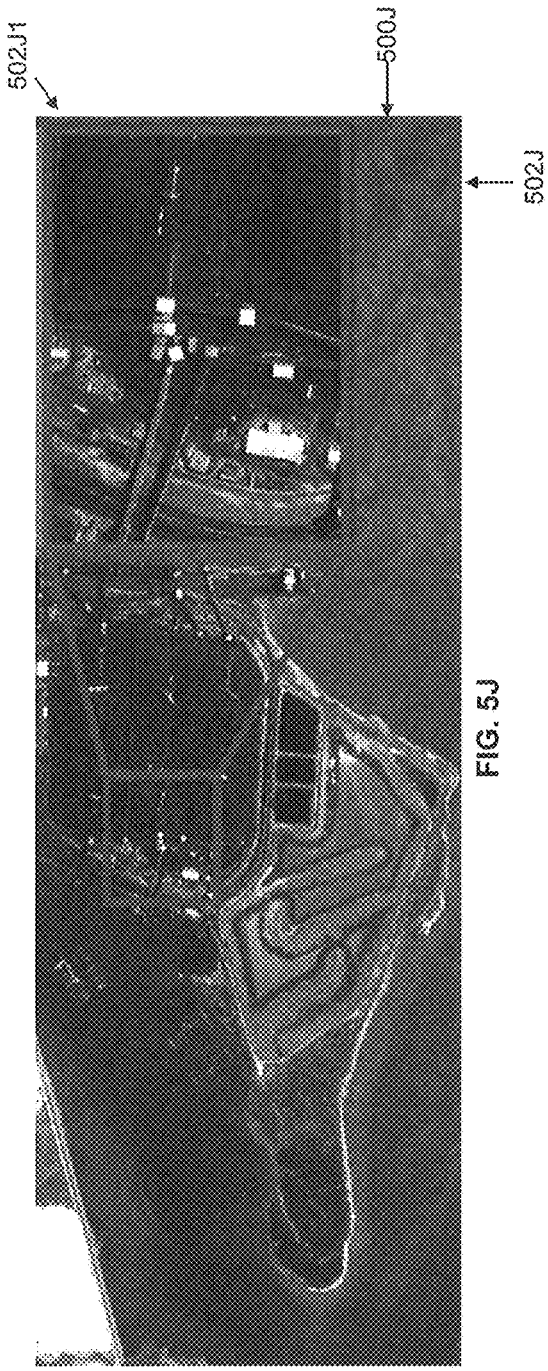

FIG. 5J illustrates an additional embodiment of a report 500J generated through the use of the present invention showing a combination of a representation 502J and an additional selected portion 502J1 of the representation magnified and coded.

Figure 5K:

FIG. 5K illustrates an added embodiment of a report 500K generated through the use of the present invention showing a combination of a representation 502K and additional selected portion 502K1, 502K2, 502K3, 502K4 that are identified by coding.

FIG. 5L illustrates an embodiment of a report 500L showing a combination of a representation 502L and additional content information—solar panel information—504L is added.

Figure 5M:
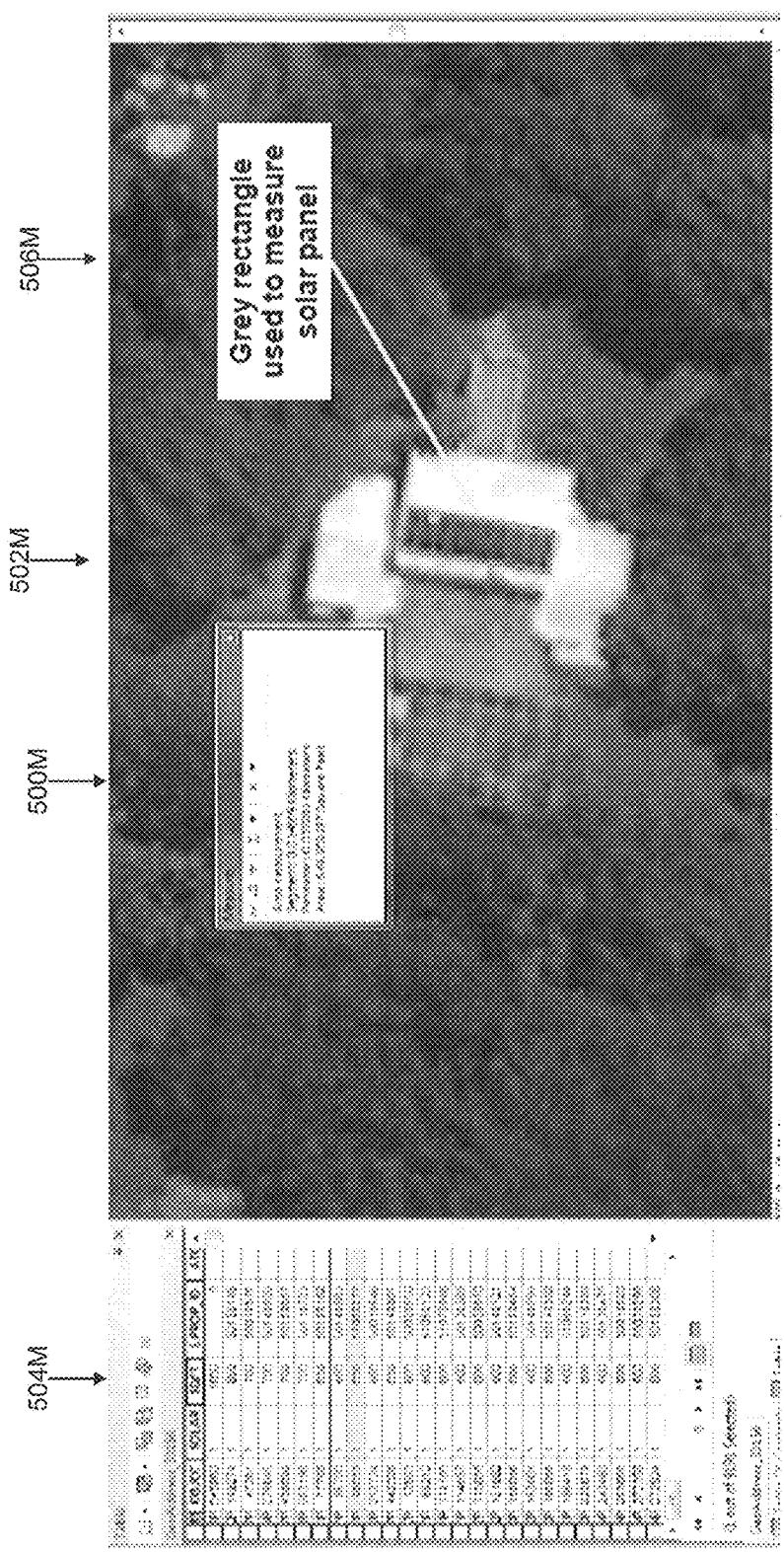

FIG. 5M illustrates a report embodiment of a report 500M showing a combination of a representation 502M and additional statistical information 504M and textual information 506M.

Figure 5N:
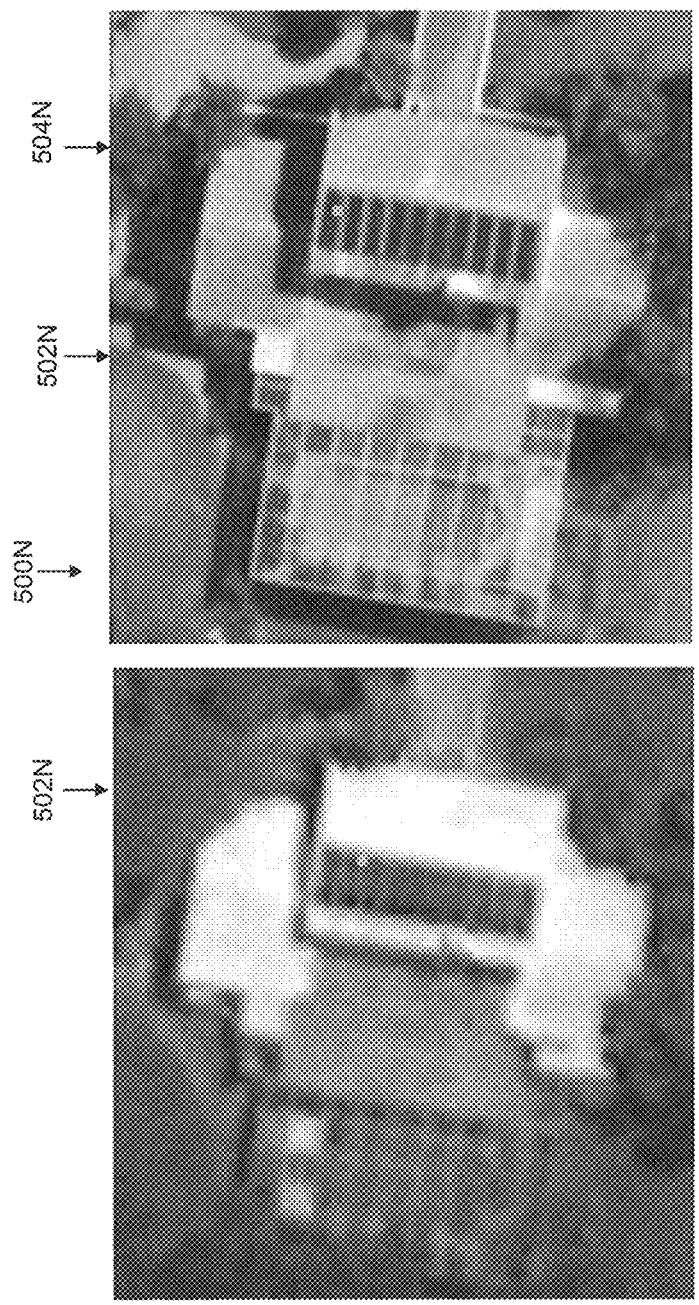

FIG. 5N illustrates an embodiment of a report 500N showing a combination of a representation 502N and additional highlighted information 504N.

Figure 5P:
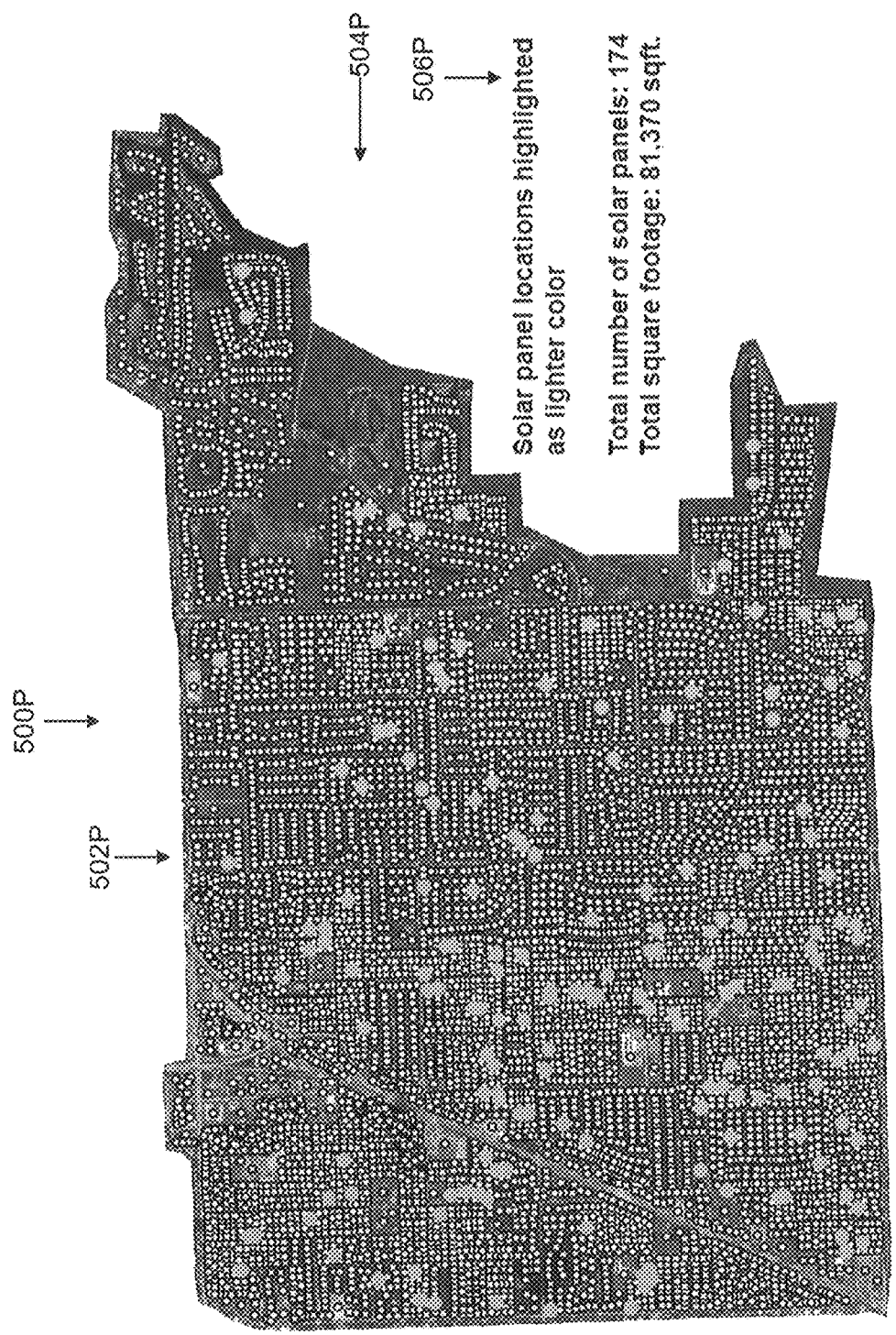

FIG. 5P illustrates an embodiment of a report 500P showing a combination of a representation 502P content information 504P including textual information 506P.

FIG. 6A-FIG. 6E illustrates embodiments of reports generated through the use of the present invention in which coded information is provided. For purposes of these Figures, Comps stands for comparable store sales and is a measurement derived from an equation: Comps=traffic growth plus shopper conversion growth+average ticket growth. It is used to determine year over year change in store sales "RSM" is the year-over-year traffic measurement obtained using the system and methods of the present invention. "EST" is an estimate of reported traffic growth from management comments.

Figure 6A:
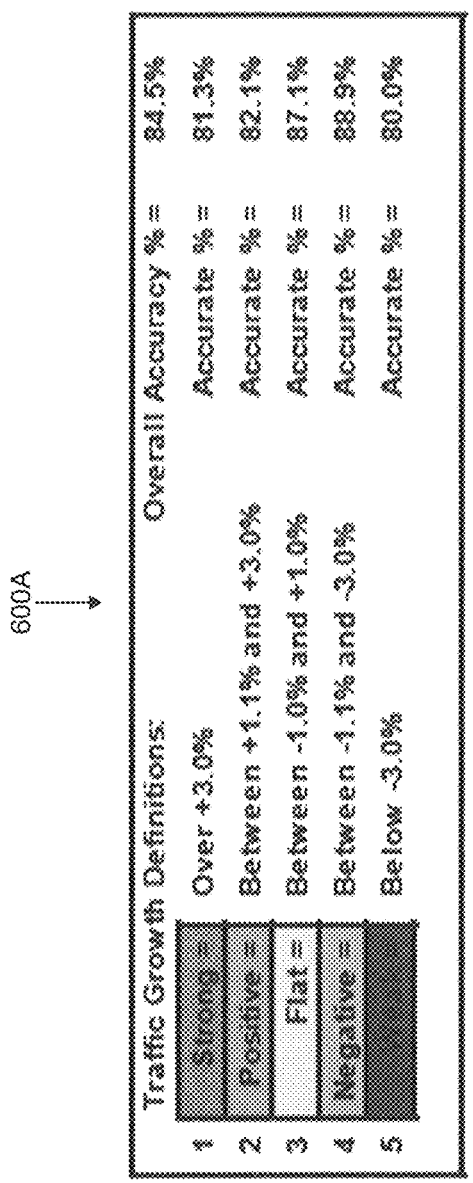
FIG. 6A-FIG. 6F illustrate certain embodiments of coded information.
Figure 6B:
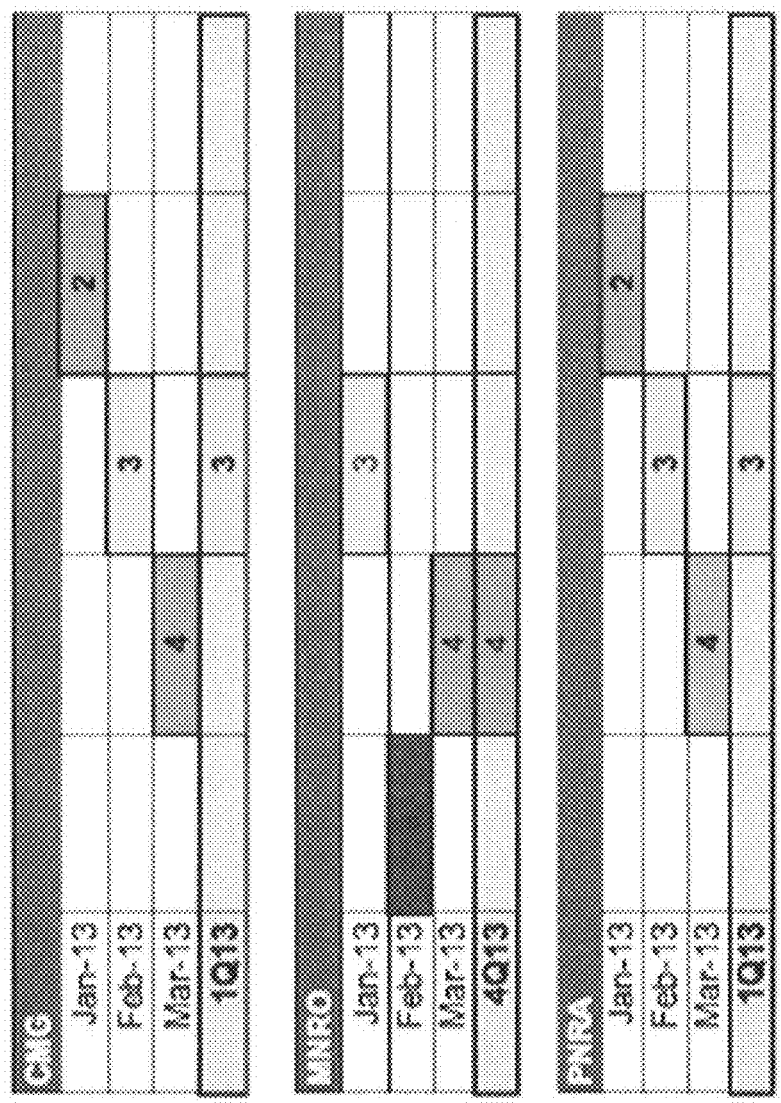
Figure 6C:
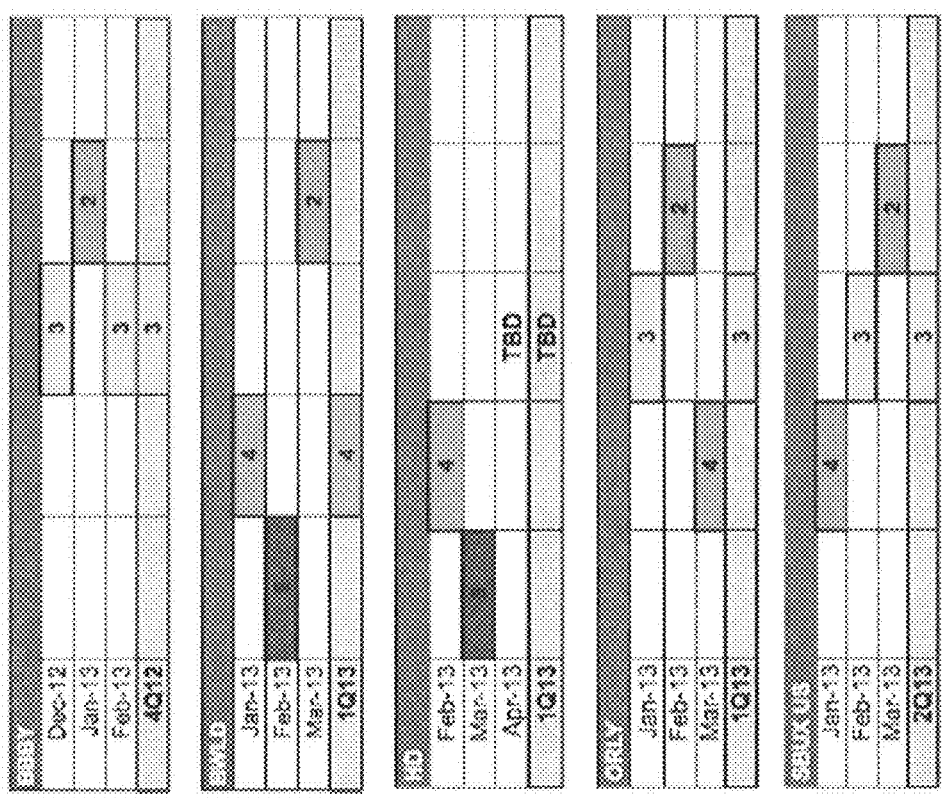
Figure 6D:
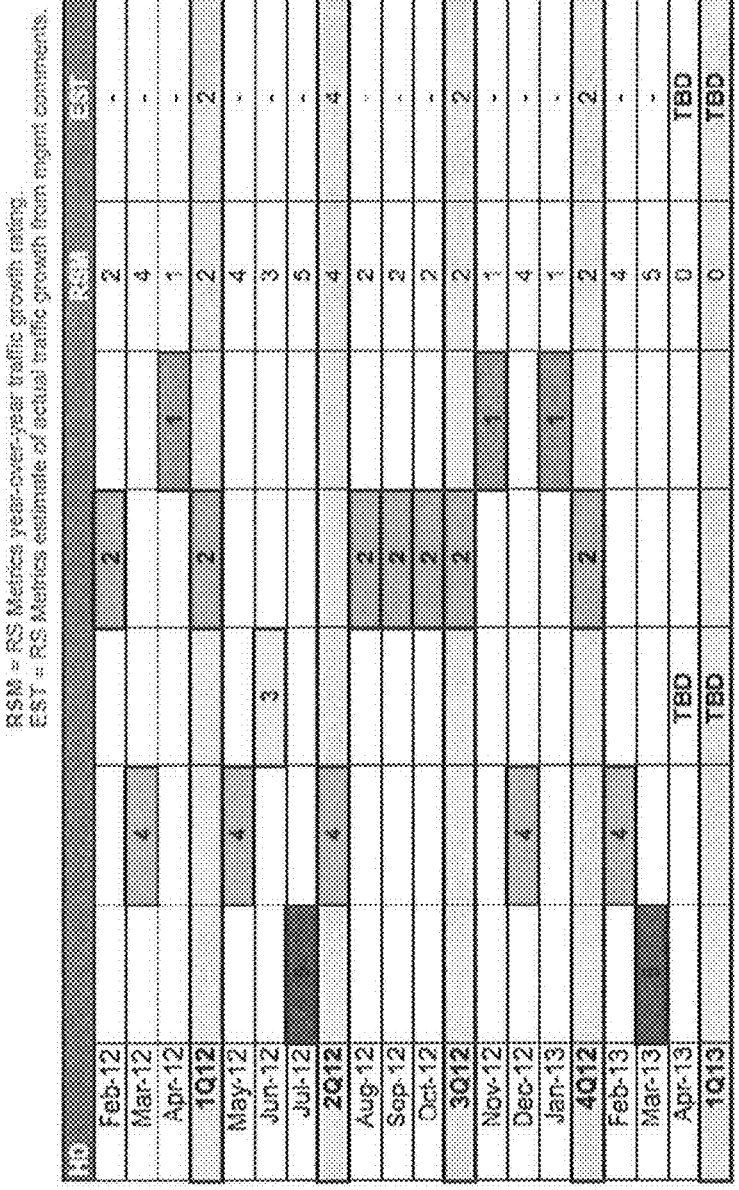
Figure 6E:
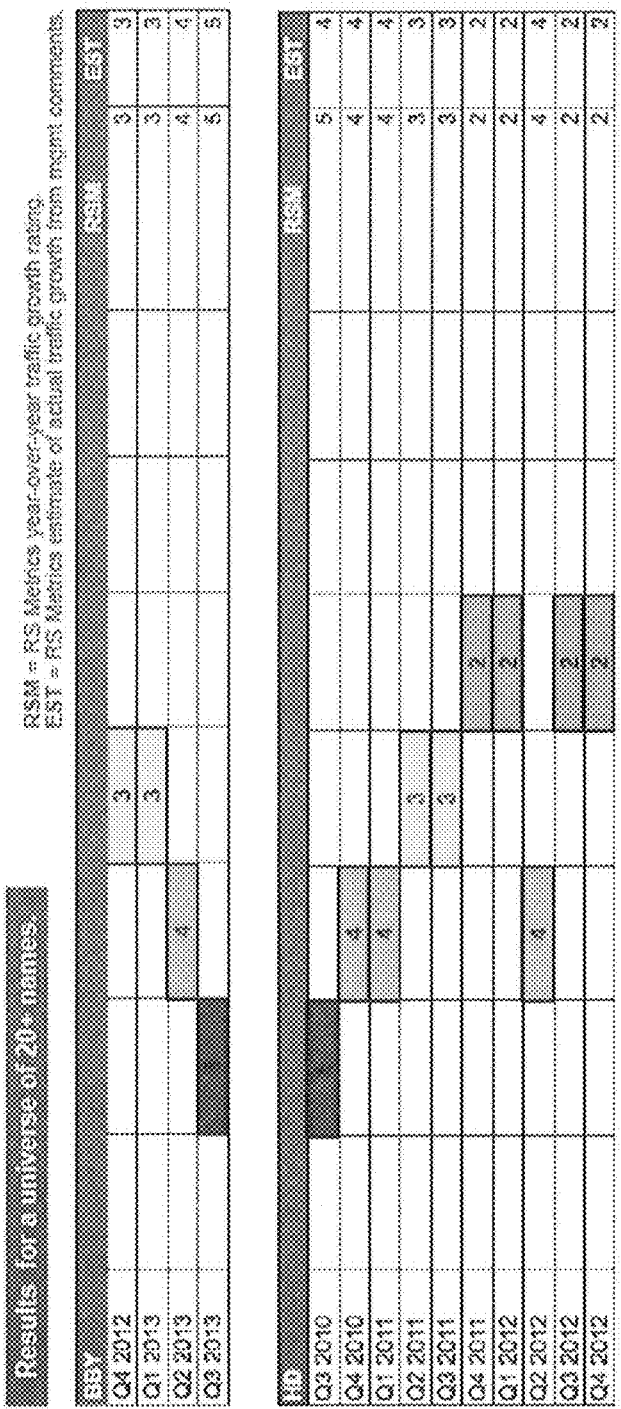
Figure 6F:
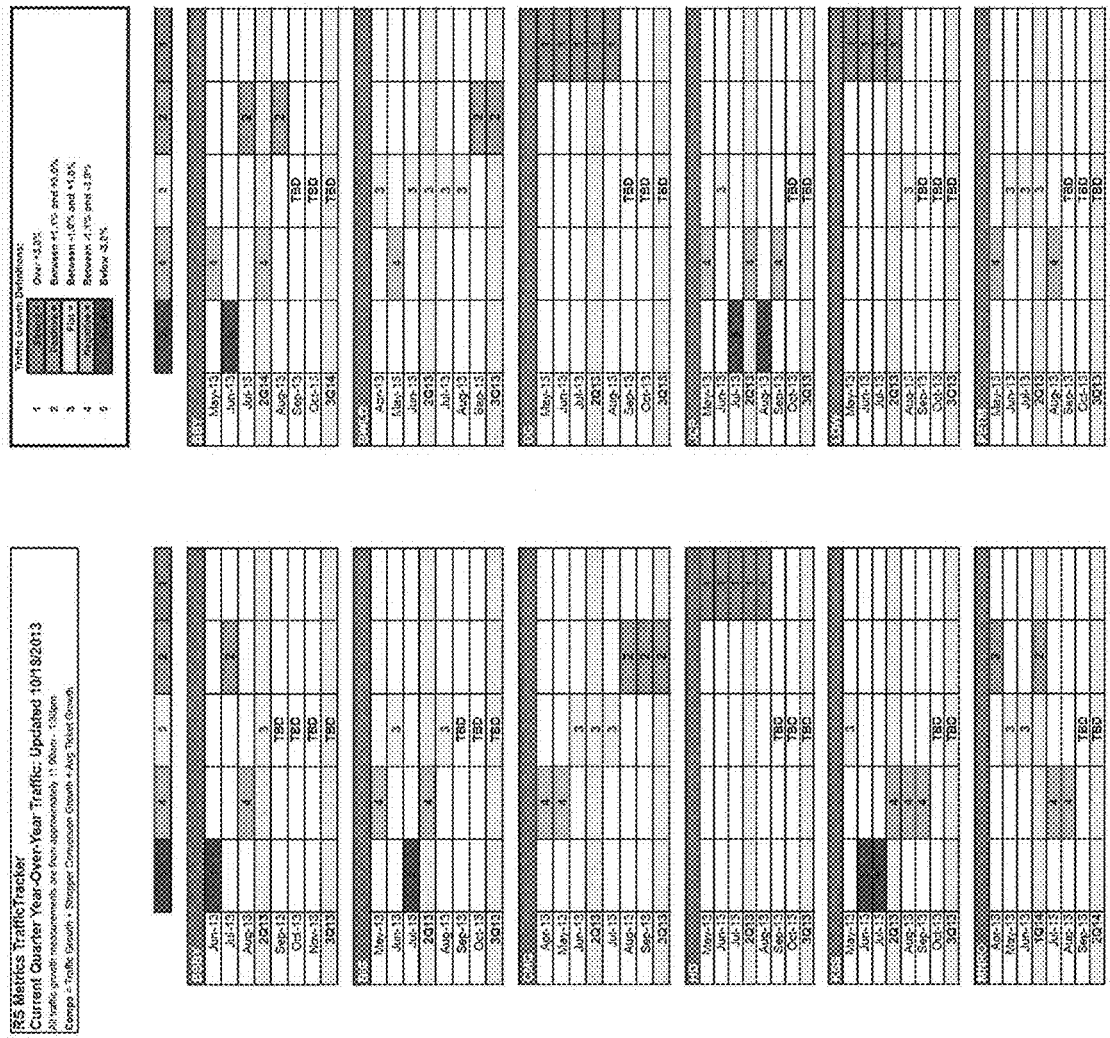

FIG. 6A illustrates one embodiment of a legend 600A in which the coding information is described. FIG. 6B-FIG. 6F illustrates the use of the numerical and color coding system, identified in legend 600A of FIG. 6A, with respect to various information.

Figure 7A:
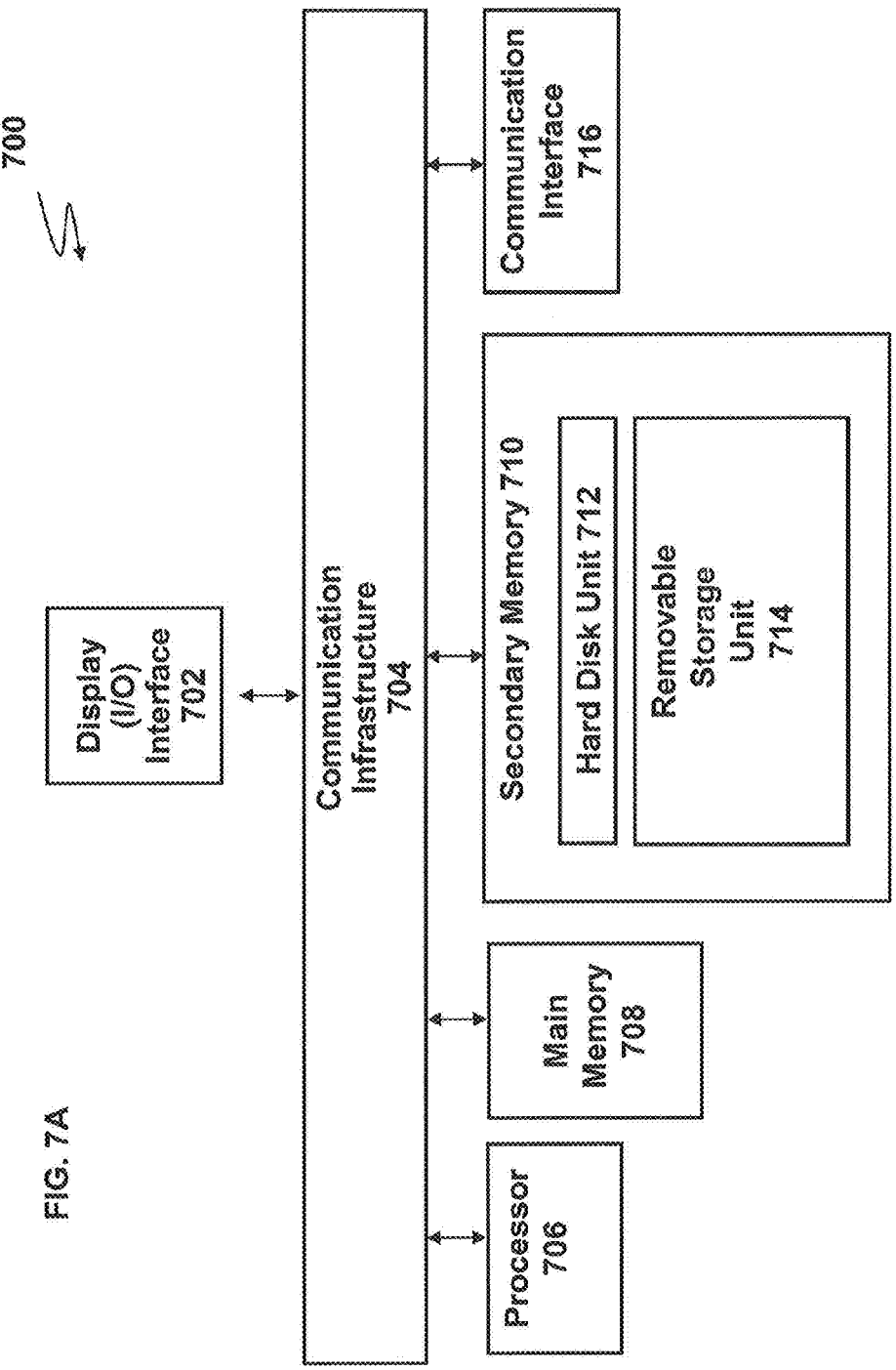
FIG. 7A illustrates an exemplary computer system 700 that may be used to implement the methods according to the invention.

FIG. 7A illustrates an exemplary computer system 700 that may be used to implement the methods according to the invention. One or more computer systems 700 may carry out the methods presented herein as computer code.

Computer system 700 includes an input/output display interface 702 connected to communication infrastructure 704—such as a bus—, which forwards data such as graphics, text, and information, from the communication infrastructure 704 or from a frame buffer (not shown) to other components of the computer system 700. The input/output display interface 702 may be, for example, a keyboard, touch screen, joystick, trackball, mouse, monitor, speaker, printer, any other computer peripheral device, or any combination thereof, capable of entering and/or viewing data.

Computer system 700 includes one or more processors 706, which may be a special purpose or a general-purpose digital signal processor that processes certain information. Computer system 700 also includes a main memory 708, for example random access memory ("RAM"), read-only memory ("ROM"), mass storage device, or any combination of tangible, non-transitory memory. Computer system 700 may also include a secondary memory 710 such as a hard disk unit 712, a removable storage unit 714, or any combination of tangible, non-transitory memory. Computer system 700 may also include a communication interface 716, for example, a modem, a network interface (such as an Ethernet card or Ethernet cable), a communication port, a PCMCIA slot and card, wired or wireless systems (such as Wi-Fi, Bluetooth, Infrared), local area networks, wide area networks, intranets, etc.

It is contemplated that the main memory 708, secondary memory 710, communication interface 716, or a combination thereof, function as a computer usable storage medium, otherwise referred to as a computer readable storage medium, to store and/or access computer software including computer instructions. For example, computer programs or other instructions may be loaded into the computer system 700 such as through a removable storage device, for example, a floppy disk, ZIP disks, magnetic tape, portable flash drive, optical disk such as a CD or DVD or Blu-ray, Micro-Electro-Mechanical Systems ("MEMS"), nanotechnological apparatus. Specifically, computer software including computer instructions may be transferred from the removable storage unit 714 or hard disc unit 712 to the secondary memory 710 or through the communication infrastructure 704 to the main memory 708 of the computer system 700.

Communication interface 716 allows software, instructions and data to be transferred between the computer system 700 and external devices or external networks. Software, instructions, and/or data transferred by the communication interface 716 are typically in the form of signals that may be electronic, electromagnetic, optical or other signals capable of being sent and received by the communication interface 716. Signals may be sent and received using wire or cable, fiber optics, a phone line, a cellular phone link, a Radio Frequency ("RF") link, wireless link, or other communication channels.

Computer programs, when executed, enable the computer system 700, particularly the processor 706, to implement the methods of the invention according to computer software including instructions.

The computer system 700 described herein may perform any one of, or any combination of, the steps of any of the methods presented herein. It is also contemplated that the methods according to the invention may be performed automatically, or may be invoked by some form of manual intervention.

The computer system 700 of FIG. 7A is provided only for purposes of illustration, such that the invention is not limited to this specific embodiment. It is appreciated that a person skilled in the relevant art knows how to program and implement the invention using any computer system.

The computer system 700 may be a handheld device and include any small-sized computer device including, for example, a personal digital assistant ("PDA"), smart handheld computing device, cellular telephone, or a laptop or netbook computer, hand held console or MP3 player, tablet, or similar hand held computer device, such as an iPad®, iPad Touch® or iPhone®.

Figure 7B:
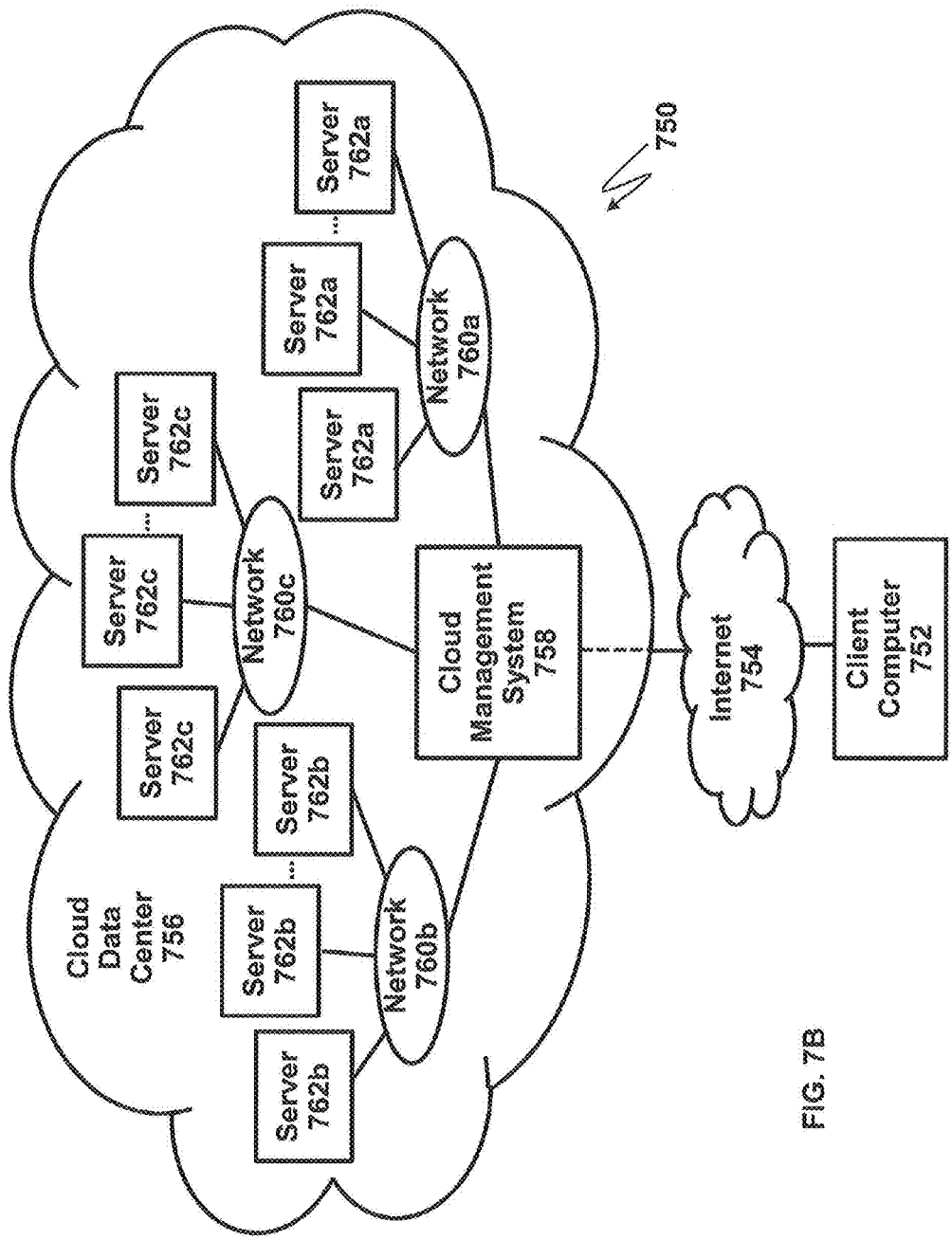
FIG. 7B is a cloud based system that may be used to implement the methods according to the invention.

Separate and apart from, or in addition to, computer system 700, the methods according to the invention may be implemented using a cloud computing system. FIG. 7B illustrates an exemplary cloud computing system 750 that may be used to implement the methods according to the present invention. The cloud computing system 750 includes a plurality of interconnected computing environments. The cloud computing system 750 utilizes the resources from various networks as a collective virtual computer, where the services and applications can run independently from a particular computer or server configuration making hardware less important.

Specifically, the cloud computing system 750 includes at least one client computer 752. The client computer 752 may be any device through the use of which a distributed computing environment may be accessed to perform the methods disclosed herein, for example, a traditional computer, portable computer, mobile phone, personal digital assistant, tablet to name a few. The client computer 752 includes a processor and memory such as random access memory ("RAM"), read-only memory ("ROM"), mass storage device, or any combination thereof as described more fully in reference to FIG. 7A.

The client computer 752 also includes a communications interface, for example, a modem, a network interface (such as an Ethernet card), a communications port, a PCMCIA slot and card, wired or wireless systems, etc. The communications interface allows communication through transferred signals between the client computer 752 and external devices including networks such as the Internet 754 and cloud data center 756. Communication may be implemented using wireless or wired capability such as cable, fiber optics, a phone line, a cellular phone link, radio waves or other communication channels.

The client computer 752 establishes communication with the Internet 754—specifically to one or more servers—to, in turn, establish communication with one or more cloud data centers 756. A cloud data center 756 includes one or more networks 760*a*, 760*b*, 760*c* managed through a cloud management system 758. Each network 760*a*, 760*b*, 760*c* includes resource servers 762*a*, 762*b*, 762*c*, respectively. Servers 762*a*, 762*b*, 762*c* permit access to a collection of computing resources and components that can be invoked to instantiate a virtual computer, process, or other resource for a limited or defined duration. For example, one group of resource servers can host and serve an operating system or components thereof to deliver and instantiate a virtual computer. Another group of resource servers can accept requests to host computing cycles or processor time, to supply a defined level of processing power for a virtual computer. A further group of resource servers can host and serve applications to load on an instantiation of a virtual computer, such as an email client, a browser application, a messaging application, or other applications or software.

The cloud management system 758 can comprise a dedicated or centralized server and/or other software, hardware, and network tools to communicate with one or more networks 760*a*, 760*b*, 760*c*, such as the Internet or other public or private network, with all sets of resource servers 762*a*, 762*b*, 762*c*. The cloud management system 758 may be configured to query and identify the computing resources and components managed by the set of resource servers 762*a*, 762*b*, 762*c* needed and available for use in the cloud data center 756. Specifically, the cloud management system 758 may be configured to identify the hardware resources and components such as type and amount of processing power, type and amount of memory, type and amount of storage, type and amount of network bandwidth and the like, of the set of resource servers 762*a*, 762*b*, 762*c* needed and available for use in the cloud data center 756. Likewise, the cloud management system 758 can be configured to identify the software resources and components, such as type of Operating System ("OS"), application programs, and the like, of the set of resource servers 762*a*, 762*b*, 762*c* needed and available for use in the cloud data center 756.

The present invention is also directed to computer products, otherwise referred to as computer program products, to provide software to the cloud computing system 750. Computer products store software on any computer useable medium, known now or in the future. Such software, when executed, may implement the methods according to certain embodiments of the invention. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, Micro-Electro-Mechanical Systems ("MEMS"), nanotechnological storage device, etc.), and communication mediums (e.g., wired and wireless communications networks, local area networks, wide area networks, intranets, etc.). It is to be appreciated that the embodiments described herein may be implemented using software, hardware, firmware, or combinations thereof.

The cloud computing system 750 of FIG. 7B is provided only for purposes of illustration and does not limit the invention to this specific embodiment. It is appreciated that a person skilled in the relevant art knows how to program and implement the invention using any computer system or network architecture.

While the disclosure is susceptible to various modifications and alternative forms, specific exemplary embodiments of the present invention have been shown by way of example in the drawings and have been described in detail. It should be understood, however, that there is no intent to limit the disclosure to the particular embodiments disclosed, but on the contrary, the intention is to cover all modifications, equivalents, and alternatives falling within the scope of the disclosure as defined by the appended claims.

The invention claimed is:

1. A computer method for generating economic comparable data for one or more retail stores comprising the steps of:

capturing by a recording device one or more visual recordings of the one or more retail stores;

sending to a processor each of the one or more visual recordings;

generating by the processor one or more representations from the each of the one or more visual recordings;

refining by the processor each of the one or more representations based on one or more criteria to produce one or more refined representations;

extracting by the processor content for evaluation from each of the one or more refined representations;

evaluating by the processor the content, wherein said evaluating step comprises the steps of:

selecting dates for a year-over-year comparable time period;

picking parameters for cloud cover and satellite collection angles;

identifying the each of the one or more representations that include an image of the one or more retail stores to produce identified representations;

sub-selecting the identified representations that meet a threshold value and match the selected dates for the year-over-year comparable time period to produce selected representations;

unifying one or more representations of the one or more retail stores and the selected representations into a new feature;

dissolving the new feature based on spatial overlap and a first number of common fields;

sorting the dissolved feature by lowest to highest panchromatic resolution;

calculating and removing duplications of the new feature, wherein the duplications of the new feature include two or more representations of the one or more retail stores captured on a same day;

dissolving the new feature based on a second number of common fields only found in the each of the one or more representations metadata to produce a remaining feature, wherein the second number of common fields is less than the first number of common fields; and displaying the remaining feature on a display, wherein the remaining feature is the economic comparable data for the one or more retail stores.

2. The method of claim 1, wherein said evaluation step further comprises balancing the extracted content to improve the comparability of the extracted content to additional extracted content.

3. The method of claim 2, wherein said balancing step is automated.

4. The method of claim 1, further comprising coding the remaining feature by assigning one or more symbols to represent the economic comparable data for the one or more retail stores.

5. The method of claim 1, wherein the first number of common fields is selected from a first group consisting of "Ticker", "Address", "State", "Store_OID", "Zip", "CATALOGID", "ACQDATE", "AVPANRES", "BROWSEURL", "CLOUDCOVER", "Latitude", and "Longitude".

6. The method of claim 1, wherein the second number of common fields is selected from a second group consisting of "CATALOGID", "ACQDATE", "AVPANRES", "BROWSEURL", and "CLOUDCOVER".

7. The method of claim 1, wherein said evaluating step further comprises the steps of:

calculating an area of the remaining feature to produce a calculated remaining feature;

detecting and removing the calculated remaining feature having an area of less than 2 square kilometers and over 40% cloud cover, and the calculated remaining feature having an area of less than 1.5 square kilometers to produce a final feature;

buffering the final feature under 3 square kilometers to be larger than 3 square kilometers; and counting the final feature by date of acquisition.

8. The method of claim 1, wherein at least one of the economic comparable data for one or more retail stores is selected from a group consisting of a fill rate of a parking lot, a market share percentage of a particular retail store in geographic location, a trend in retail store revenues over time or over a geographic region, a value of sales of one or more retailers, a value of the share of vehicles over a specific time period, and a close rate of vehicles in a parking lot of a retailer versus actual transactions measured by the retailer.

9. The method of claim 1, wherein the economic comparable data for one or more retail stores is a value of a share of vehicles over a specific time period, wherein the value of a share of vehicles over a specific time period is calculated as:

a total of vehicles at retailer A, divided by the total of vehicles at the retailer A plus a total of vehicles at a retailer N, where N is any number of retailers.

10. The method of claim 1, wherein the recording device is one or more selected from a group consisting of a camera, a satellite camera, and an aerial mapping camera.

11. The method of claim 1, wherein the one or more criteria is selected from a group consisting of resolution, pixilation, cloud cover, date of creation, date of modification, time of day of creation, type of camera, zoom in or zoom out, completeness of coverage of a topic, removal of duplicate portions of target information, and perspective from which the one or more representations was captured.

12. The method of claim 1, wherein the threshold value includes a cloud cover of less than 70 percent across a full image and an average panchromatic resolution of less than 0.85 centimeters per pixel.

13. A computer system for generating economic comparable data for one or more retail stores comprising:

a recording device capturing one or more visual recordings of a geographic location;

a processor in communication with the recording device, the processor including instructions that when executed cause the processor to:

receive the one or more visual recordings and generate one or more representations from each of the one or more visual recordings, extract content for evaluation from each of the one or more representations, said evaluating step further comprising the steps of:

selecting dates for a year-over-year comparable time period;

picking parameters for cloud cover and satellite collection angles;

identifying the each of the one or more representations that include an image of the one or more retail stores to produce identified representations;

sub-selecting the identified representations that meet a threshold value and match the selected dates for the year-over-year comparable time period to produce selected representations;

unifying one or more representations of the one or more retail stores and the selected representations into a new feature;

dissolving the new feature based on spatial overlap and a first number of common fields;
sorting the dissolved feature by lowest to highest panchromatic resolution;
calculating and removing duplications of the new feature, wherein the duplications of the new feature include two or more representations of the one or more retail stores captured on a same day;
dissolving the new feature based on a second number of common fields only found in the each of the one or more representations metadata to produce a remaining feature, wherein the second number of common fields is less than the first number of common fields; and
displaying the remaining feature on a display, wherein the remaining feature is the economic comparable data for the one or more retail stores.

14. The computer system of claim 13, wherein said evaluating step further comprises balancing by the processor the extracted content to improve comparability of the extracted content to additional extracted content.

15. The computer system of claim 13, further comprising coding the remaining feature by the processor by assigning one or more symbols to represent the economic comparable data for one or more retail stores.

16. The computer system of claim 13, wherein at least one of the economic comparable data for one or more retail stores is selected from a group consisting of a fill rate of a parking lot, a market share percentage of a particular retail store in geographic location, a trend in retail store revenues over time or over a geographic region, a value of sales of one or more retailers, a value of the share of vehicles over a specific time period, and a close rate of vehicles in a parking lot of a retailer versus actual transactions measured by the retailer.

17. The computer system of claim 13, wherein the economic comparable data for one or more retail stores is a value of a share of vehicles over a specific time period, wherein the value of a share of vehicles over a specific time period is calculated as:
a total of vehicles at retailer A, divided by the total of vehicles at the retailer A plus a total of vehicles at a retailer N, where N is any number of retailers.

18. The computer system of claim 13, wherein the threshold value includes a cloud cover of less than 70 percent across a full image, and an average panchromatic resolution of less than 0.85 centimeters per pixel.

* * * * *